(12) United States Patent
Elangovan et al.

(10) Patent No.: US 12,547,841 B2
(45) Date of Patent: Feb. 10, 2026

(54) MEDICAL CONVERSATION SUMMARIZATION STYLE INTELLIGENCE

(71) Applicant: Amazon Technologies, Inc., Seattle, WA (US)

(72) Inventors: Aparna Elangovan, Seattle, WA (US); Lei Xu, Jersey City, NJ (US); Devang Kulshreshtha, Montreal (CA); Sravan Babu Bodapati, Fremont, CA (US); Katrin Kirchhoff, Seattle, WA (US); Sarthak Handa, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 18/339,749

(22) Filed: Jun. 22, 2023

(65) Prior Publication Data

US 2024/0428002 A1 Dec. 26, 2024

(51) Int. Cl.
*G06F 40/35* (2020.01)
*G06F 40/40* (2020.01)

(52) U.S. Cl.
CPC ............. *G06F 40/35* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 6,246,981 B1 | 6/2001 | Papineni et al. | |
| 6,510,411 B1 | 1/2003 | Norton et al. | |
| 6,785,653 B1 | 8/2004 | White | |
| 7,197,460 B1 | 3/2007 | Gupta et al. | |
| 9,703,602 B1 | 7/2017 | Kusters et al. | |
| 10,194,027 B1 | 1/2019 | Daddi | |

(Continued)

FOREIGN PATENT DOCUMENTS

| | | |
|---|---|---|
| EP | 2933070 | 10/2018 |
| WO | 9723088 | 6/1997 |
| WO | 2019169272 | 9/2019 |

OTHER PUBLICATIONS

Svetlana Stoyanchev et al "Rapid Prototyping of Form-driven Dialogue Systems Using an Open-Source Framework", Proceddings of the Sigdial 2016 Conference, pp. 216-219.

(Continued)

*Primary Examiner* — Douglas Godbold
(74) *Attorney, Agent, or Firm* — Alexander A. Knapp; Kowert, Hood, Munyon, Rankin & Goetzel, P.C.

(57) ABSTRACT

A medical audio summarization service receives a medical conversation and an indication of a user preferred summarization style selected from a plurality of available summarization styles to generate a medical summary that conforms to the user preferred summarization style. A transcript is generated via a medical audio transcription service, and the transcript is used by a natural language processing engine (including a large language model) to generate the medical summary. The large language model is trained to be used to generate medical summaries that conform to respective ones of a plurality of user preferred summarization styles. The large language model is trained using training data comprising previously generated summaries and summary interaction metadata generated from user edits and/or feedback.

20 Claims, 14 Drawing Sheets

(56) References Cited

U.S. PATENT DOCUMENTS

| | | | |
|---|---|---|---|
| 10,237,405 | B1 | 3/2019 | Neuer, III |
| 10,331,791 | B2 | 6/2019 | Anbazhagan et al. |
| 10,552,274 | B1 | 2/2020 | Zhao |
| 10,891,152 | B2 | 1/2021 | Anbazhagan et al. |
| 11,101,022 | B2 | 8/2021 | Owen |
| 11,562,735 | B1 | 1/2023 | Gupta et al. |
| 2006/0070086 | A1 | 3/2006 | Wang |
| 2007/0143099 | A1 | 6/2007 | Balchandran et al. |
| 2010/0298012 | A1 | 11/2010 | Damarla |
| 2014/0032762 | A1 | 1/2014 | Harvey |
| 2015/0036503 | A1 | 2/2015 | Kaplan et al. |
| 2015/0263941 | A1 | 9/2015 | Jung |
| 2016/0042748 | A1 | 2/2016 | Jain et al. |
| 2016/0142323 | A1 | 5/2016 | Lehmann et al. |
| 2016/0225370 | A1 | 8/2016 | Kannan et al. |
| 2017/0116392 | A1 | 4/2017 | Casella dos Santos |
| 2017/0125008 | A1 | 5/2017 | Maisonnier et al. |
| 2017/0168603 | A1 | 6/2017 | Glotzbach |
| 2017/0230779 | A1 | 8/2017 | Wang et al. |
| 2017/0286916 | A1 | 10/2017 | Skiba et al. |
| 2018/0365309 | A1 | 12/2018 | Oliner |
| 2019/0027188 | A1* | 1/2019 | Akolkar ............... G06V 10/763 |
| 2019/0122766 | A1* | 4/2019 | Strader ................. G16H 40/63 |
| 2020/0051550 | A1 | 2/2020 | Baker |
| 2020/0314623 | A1 | 10/2020 | Pellegrini |
| 2021/0158458 | A1 | 5/2021 | Waldrop |
| 2021/0191650 | A1 | 6/2021 | Vansteenkiste et al. |
| 2021/0192126 | A1* | 6/2021 | Gehrmann ............ G06N 20/00 |
| 2021/0335367 | A1 | 10/2021 | Graff |
| 2021/0375289 | A1 | 12/2021 | Zhu et al. |
| 2021/0398020 | A1 | 12/2021 | Ahmed |
| 2022/0115134 | A1* | 4/2022 | Strader .................. G10L 15/00 |
| 2022/0172725 | A1 | 6/2022 | Khan |
| 2022/0375605 | A1 | 11/2022 | Lipton |
| 2023/0081372 | A1* | 3/2023 | Hartman ............... G16H 50/20 705/2 |
| 2023/0223016 | A1* | 7/2023 | Konam ................. G06F 40/284 704/231 |
| 2023/0334263 | A1* | 10/2023 | Konam ................. G16H 10/20 |
| 2023/0360557 | A1 | 11/2023 | Balakrishnan |
| 2024/0202582 | A1 | 6/2024 | Schillace |
| 2024/0281594 | A1* | 8/2024 | Rao ...................... G06F 40/166 |
| 2024/0281596 | A1* | 8/2024 | Rao ...................... G06F 40/169 |
| 2024/0303466 | A1 | 9/2024 | Sharma |
| 2024/0320430 | A1 | 9/2024 | Fu |
| 2024/0331821 | A1 | 10/2024 | Gupta et al. |
| 2024/0340193 | A1* | 10/2024 | Zhu ....................... G06F 40/30 |
| 2024/0370661 | A1* | 11/2024 | Hirshberg ............. G06F 40/40 |
| 2025/0111133 | A1* | 4/2025 | Zhu ...................... G06F 40/166 |

OTHER PUBLICATIONS

Claus Brabrand "PowerForms: Declarative client-side form field validation" Brics Report Series, Jan. 1, 2000, pp. 205-214.
Robert Jamison, "Announcing a New Tool for Building Interactive Adventure Games on Alexa", Amazon Mobile App Distribution Blog, Retrieved from URL: https://developer.amazon.com/public/community/post/TxEQV5K754YS77/Announcing-a-New-Tool-for-Building-Interactive-Adventure-Games-on-Alexa on Oct. 30, 2016, pp. 1-11.
"Getting Started with the Alexa Skills Kit", Amazon Apps & Games Developer Portal, Retrieved from URL: https://developer.amazon.com/pulbic/solutions/slexas/alexa-skills-kit/getting-started-guide on Oct. 30, 2016, pp. 1-7.
Seth Rosenberg, "How to Build Bots for Messenger", Facebook for Developers, Retrieved from URL: https://developers.facebook.com/blog/post/2016/04/12/bots-for-messenger on Oct. 30, 2016, pp. 1-5.
Ali El-Kahky, et al., "Entending Domain Coverage of Language Understanding Systems Via Intent Transfer Between Domains Using Knowledge Graphs and Search Query Click Logs", 2014 IEEE International Conference on Acoustic, Speech and Signal Processing (ICASSP), pp. 4087-4091.
Elad Natanson, "Messaging Platforms, Bots and The Future of Mobile", Retrieved from URL: http://www.forbes.com/sites/eladnatanson/2016/04/08/messaging-platforms-bot-and-the-future-of-mobile/#2d1ab79884af on Oct. 30, 2016. pp. 1-7.
"Messenger Platform", Facebook for Developers, Retrieved from URL: https://developers.facebook.com/doc/messenger-platform on Oct. 30, 2016, pp. 1-3.
Collen Estrada, "Microsoft Bot Framework", Mar. 30, 2016, Retrieved from URL: https://blog.botframework.com/2016/03/30/BotFramework/ on Oct. 30, 2016, pp. 1-7.
"Microsoft Cognitive Services—APIs", Retrieved from URL: https://www.microsoft.com/cognitive-services/en-us/apis on Oct. 30, 2016, pp. 1-8.
Himanshu S. Bhatt, et al., "Cross-domain Text Classification with Multiple Domains and Disparate Label Sets", Proceedings of the 54th Annual Meeting of the Association for Computational Linguistics, Aug. 7-12, 2016, pp. 1641-1650.
Amit Fulay, "Say hello to Google Allo: a smarter messaging app", Retrieved from URL: https://blog.google/products/allo/google-allo-smater-messaging-app on Oct. 30, 2016, pp. 1-14.
"Training for the Alexa Skills Kit", Amazon Apps & Games Developer Portal, Retrieved from URL: https://developer.amazon.com/public/solutions/alexa/alexa-skills-kits/content/alexa-skilss-developer-training on Oct. 30, 2016, pp. 1-4.
Wikipedia, "Vorbis", Retrieved from URL: https://en.wikipedia.org/wiki/Vorbis on Sep. 26, 2016, pp. 1-10.
Voice Extensible Markup Language (Voice XML) Version 2.0, hhttps://www.w3.org/TR/voicexml20/; Mar. 16, 2004, pp. 1-148.
U.S. Appl. No. 17/039,900, filed Sep. 30, 2020, Swapandeep Singh et al.
U.S. Appl. No. 17/039,920, filed Sep. 30, 2020, Jin Hoon Bang et al.
U.S. Appl. No. 17/219,640, filed Mar. 31, 2021, Pokkunuri, et al., Amazon Technologies, Inc., pp. 1-79, drawing pp. 1-20.
U.S. Appl. No. 17/219,630, filed Mar. 31, 2021, Pushkin, et al., Amazon Technologies, Inc., pp. 1-79, drawing pp. 1-20.
U.S. Appl. No. 17/030,204, filed Sep. 23, 2020, Saab Mansour.
U.S. Appl. No. 17/039,889, filed Sep. 30, 2020, Swapandeep Singh et al.
U.S. Appl. No. 17/548,416, filed Dec. 10, 2021, Dhanush Bekal Kannangola, et al.
U.S. Appl. No. 17/810,325, filed Jun. 30, 2022, Subhojit Das, et al.
U.S. Appl. No. 18/194,350, filed Mar. 31, 2023, Vijit Gupta, et al.

* cited by examiner

Transcript of Medical Conversation

*Speaker 1: You have nausea, and vomiting?*
*Speaker 2: Yes it started four hours ago. I just got back from a foreign trip. Vomited once at 9 PM and again pretty much every 30 minutes, like 6 times.*
*Speaker 1: What color?*
*Speaker 2: It's green and yellow*

*Speaker 1: Alrighty, most likely a bug you picked up while traveling internationally that will initiate like* gastroenteritis or colitis. *Your vomit color is something to be concerned about because we don't want you to be dehydrated*
*Speaker 2: Alright*

*Speaker 1: So we recommend you go to urgent care to do any studies and also give you IV fluids to help replenish as well as medication to help with nausea and vomiting.*
*Speaker 2: Okay.*
*Speaker 1: You may get a call in 24 hours just to check in and see how you are doing.*

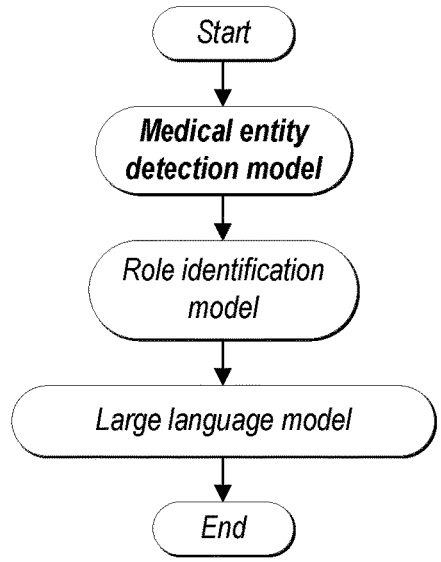

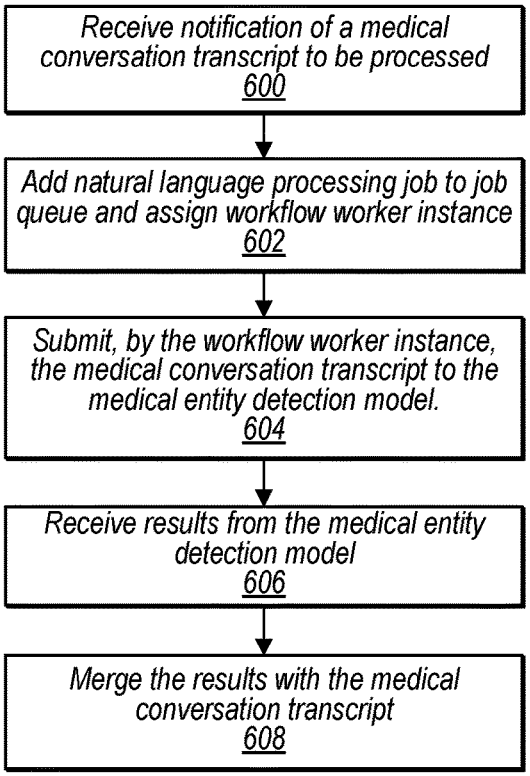

FIG. 6

Transcript of Medical Conversation

*History*

Physician: You have <u>nausea, and vomiting</u>? — Reason for visit
Patient: Yes it started <u>four hours ago</u>. I just got back from a foreign trip. <u>Vomited once at 9 PM</u> and <u>again pretty much every 30 minutes, like 6 times.</u> — Onset 1 / Onset 2
Physician: What color?
Patient: It's <u>green and yellow</u> — Quality

*Assessment*

Physician: Alrighty, most likely a bug you picked up while traveling internationally that will initiate like ⌐gastroenteritis or colitis.⌐ Your <u>vomit color is something to be concerned about because we don't want you to be dehydrated</u> — Diagnosis / Observation
Patient: Alright

*Plan*

Physician: So we recommend you <u>go to urgent care to do any studies</u> <u>and also give you IV fluids to help replenish as well as medication to help with nausea and vomiting.</u> — Instruction / Instruction
Patient: Okay.
Physician: <u>You may get a call in 24 hours just to check in and see how you are doing.</u> — Instruction

Generated Summary
(Detailed Style)

History:
Patient presented with chief complaint of nausea and vomiting. Patient started experiencing vomiting 4 hours ago at 9 PM and have had it about 6 times- every 30 minutes. The vomit is green and yellow in color.

Assessment:
<u>Differential Diagnosis</u>: gastroenteritis or colitis
<u>Observation</u>: Patient has had concerning levels of vomiting over a short span of time which warrants follow-up. Patient's vomit is greenish-yellow in color which raises concern regarding dehydration.

Plan:
Patient was recommended a visit to Urgent Care to get IV fluid and medication for nausea and vomiting. Care team will follow-up with the patient in 24 hours.

*FIG. 8A*

Transcript of Medical Conversation

*History*

Physician: You have <u>nausea, and vomiting</u>? — Reason for visit
Patient: Yes it started <u>four hours ago</u>. I just got back from a foreign trip. <u>Vomited once at 9 PM and again pretty much every 30 minutes, like 6 times.</u> — Onset 1, Onset 2
Physician: What color?
Patient: It's <u>green and yellow</u> — Quality

*Assessment*

Physician: Alrighty, most likely a bug you picked up while traveling internationally that will initiate like ⟦gastroenteritis or colitis.⟧ — Diagnosis
<u>Your vomit color is something to be concerned about because we don't want you to be dehydrated</u> — Observation
Patient: Alright

*Plan*

Physician: So we recommend you <u>go to urgent care to do any studies and also give you IV fluids to help replenish</u> as well as <u>medication to help with nausea and vomiting.</u> — Instruction, Instruction
Patient: Okay.
Physician: <u>You may get a call in 24 hours just to check in and see how you are doing.</u> — Instruction

---

Generated Summary
*(Succinct Style)*

History:
Nausea and vomiting; started 4 hrs. ago (9 PM); occurred 6x, every 30 min; green and yellow vomit.

Assessment:
<u>Differential Diagnosis</u>:
Gastroenteritis or colitis
<u>Observation</u>: Concerning levels of vomiting over a short span of time; warrants follow-up; greenish-yellow vomit raises dehydration concern.

Plan:
Recommend visit to Urgent Care for IV fluid and medication; care team follow-up with the patient in 24 hrs.

*FIG. 8B*

Transcript of Medical Conversation

History

Physician: You have <u>nausea, and vomiting</u>? — Reason for visit
Patient: Yes it started <u>four hours ago.</u> I just got back from a foreign trip. <u>Vomited once at 9 PM and again pretty much every 30 minutes, like 6 times.</u> — Onset 1 / Onset 2
Physician: What color?
Patient: It's <u>green and yellow</u> — Quality

Assessment

Physician: Alrighty, most likely a bug you picked up while traveling internationally that will initiate like [gastroenteritis or colitis.] Your <u>vomit color is something to be concerned about because we don't want you to be dehydrated</u> — Diagnosis / Observation
Patient: Alright

Plan

Physician: So we recommend you <u>go to urgent care to do any studies and also give you IV fluids to help replenish as well as medication</u> to help with nausea and vomiting. — Instruction / Instruction
Patient: Okay.
Physician: <u>You may get a call in 24 hours</u> just to check in and see how you are doing. — Instruction

---

Generated Summary
(Detailed Style for History, Succinct Style for Assessment and Plan Sub-sections)

History:
Patient presented with chief complaint of nausea and vomiting. Patient started experiencing vomiting 4 hours ago at 9 PM and have had it about 6 times- every 30 minutes. The vomit is green and yellow in color.

Assessment:
<u>Differential Diagnosis</u>:
Gastroenteritis or colitis
<u>Observation</u>: Concerning levels of vomiting over a short span of time; warrants follow-up; greenish-yellow vomit raises dehydration concern.

Plan:
Recommend visit to Urgent Care for IV fluid and medication; care team follow-up with the patient in 24 hrs.

*FIG. 8C*

MEDICAL CONVERSATION SUMMARIZATION STYLE INTELLIGENCE

BACKGROUND

Some enterprises implement services for generating transcripts of conversations. For example, automatic speech recognition (ASR) may be used to generate transcripts. Also, some enterprises provide natural language processing (NLP) services. However, general purpose ASR and NLP systems may not function well for medical conversations for various reasons, such as due to use of specialized terms in the medical industry. Moreover, although NLP services may provide acceptable results when asked to perform discrete low-level tasks, they may provide low quality results when asked to perform higher-level tasks, such as generating an overall summary of a medical conversation. Furthermore, NLP services may experience difficulties in generating an overall summary of a medical conversation according to a specific style.

BRIEF DESCRIPTION OF THE DRAWINGS

FIG. 6 is a block diagram illustrating medical entities in a transcript of a medical conversation, a workflow for generating a summary of the medical conversation, and a process of detecting medical entities in the transcript of the medical conversation, according to some embodiments.

FIG. 8A is a block diagram illustrating an annotated transcript of a medical conversation indicating identified medical entities, identified speaker roles, labeled sections, and extracted phrases of the transcript and a generated summary conforming to a user preferred "detailed" summarization style, according to some embodiments.

FIG. 8B is a block diagram illustrating an annotated transcript of a medical conversation indicating identified medical entities, identified speaker roles, labeled sections, and extracted phrases of the transcript and a generated summary conforming to a user preferred "succinct" summarization style, according to some embodiments.

FIG. 8C is a block diagram illustrating an annotated transcript of a medical conversation and generated sub-sections of a summary of the medical conversation conforming to respective user preferred sub-section summarization styles, according to some embodiments.

Figure 1:
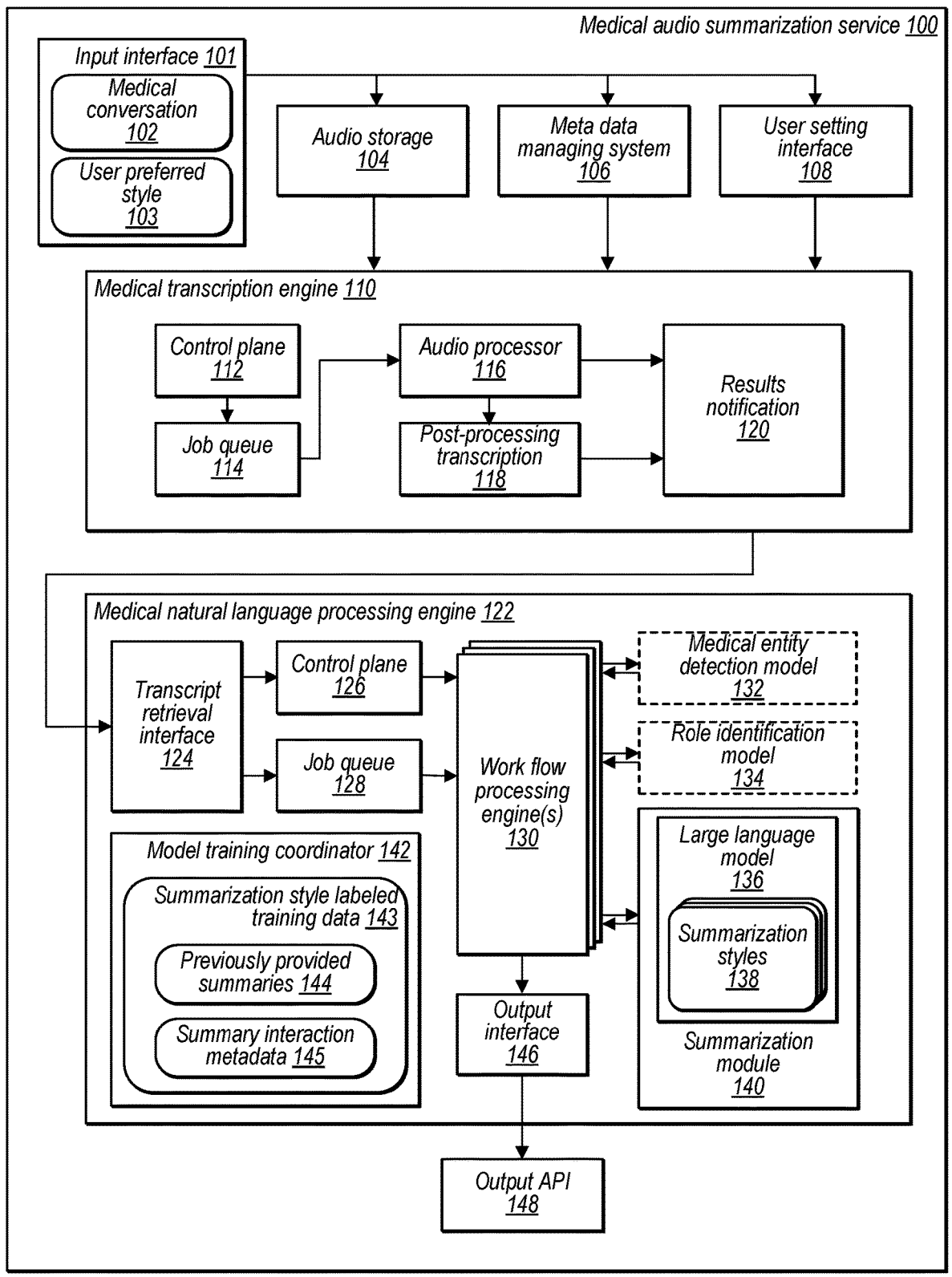
FIG. 1 is a block diagram illustrating a medical audio summarization service, wherein a medical transcription service generates a transcript of a medical conversation and a medical natural language processing engine generates a summary document conforming to a preferred summarization style based on the transcript of the medical conversation, according to some embodiments.

While embodiments are described herein by way of example for several embodiments and illustrative drawings, those skilled in the art will recognize that embodiments are not limited to the embodiments or drawings described. The drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . ." Such a claim does not foreclose the apparatus from including additional components.

"Configured To." Various units, circuits, or other components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on). The units/components used with the "configured to" language include hardware—for example, circuits, memory storing program instructions executable to implement the operation, etc. Reciting that a unit/component is "configured to" perform one or more tasks is expressly intended not to invoke 35 U.S.C. § 112, paragraph (f), for that unit/component. Additionally, "configured to" can include generic structure that is manipulated by software or firmware to operate in manner that is capable of performing the task(s) at issue.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

It will also be understood that, although the terms 1, 2, N, etc. may be used herein to describe various elements, these elements should not be limited by these terms. These terms are only used to distinguish one element from another. For example, a component with the term 1 could be termed a second component, and, similarly, a component with the term 2 could be termed a first component, without departing from the scope of the present invention. The first components and the second component are both components, but they are not the same components. Also, the term N indicates that an Nth amount of the elements may or may not exist depending on the embodiments.

DETAILED DESCRIPTION OF EMBODIMENTS

The present disclosure relates to methods and apparatus for implementing a medical conversation summarization service that generates a summary of a medical conversation, wherein the generated summary conforms to a preferred summarization style of a user. The summary may be generated using a trained large language model that has been trained using summarization style labeled training data, wherein the medical conversation summarization service may allow users to provide edits and/or feedback of the generated summary. These edits and/or feedback may be used as part of the training data. For example, summarization style labeled training data used to train the large language model may comprise summaries previously provided as respective outputs of the medical conversation summarization service as well as summary interaction metadata generated from the provided edits and/or feedback of the previously provided summaries.

Currently, the burden of documenting clinical visits is one of the largest sources of inefficiency in healthcare. Physicians often spend considerable time navigating different tabs, fields, and drop-downs in electronic health record (EHR) systems to capture details such as medications, allergies, and medical conditions. Physicians also make short-hand notes during the consultation on topics such as patient's history of illness or clinical assessment, and enter their summarized notes in the EHR systems after the visit, often during the off-peak hours. Even with the help of scribes, creating clinical documentation and summaries can be time consuming and inefficient. Moreover, many of the physicians may prefer that a medical conversation be summarized according to a specific style. For example, even for a same medical conversation, one physician may prefer that the medical summary conform to a concise style whereas another physician may prefer that the medical summary conform to a detailed style.

Training a machine learning model to generate a summary of a medical conversation that conforms to a preferred style of a user may be beneficial for various reasons. For example, physicians may be inclined towards using a medical conversation summarization service if the summaries are written in the physician's preferred style. For example, summaries written in a preferred style of a user, such as a physician, may be more easily understood by the user (e.g., physician) and may improve the user's (e.g., physician's) efficiency as the user is more familiar with the structure and terminology of the preferred style. Moreover, a user, such as a physician, may determine that a medical summary conforming to a preferred style is better suited to convey nuances and details of a particular medical conversation. For example, in certain medical contexts, a conversation may be communicated more effectively in styles that emphasize brevity (thus making it easier for other healthcare professionals to quickly digest large amounts of information), whereas other conversations may be communicated more effectively through a more verbose style (thus capturing nuanced details of the conversation). Moreover, a machine learning model that is able to generate a summary of a medical conversation according to a preferred style may allow standardization of summary styles that are consistent across the various medical conversations. A standardization of summary styles may increase efficiency across an entire organization familiar with the standardized summarization style. Thus, the ability to summarize a medical conversation in a specific style preferred by a user may increase consistency, clarity, and accuracy across summaries of various medical conversations.

Although, generating summaries of medical conversations according to specific styles may provide numerous benefits, it may be difficult for machine learning models to perform for variety of reasons. For example, medical conversations may be requested to be summarized in any one of a wide range of preferred styles, and training a model to capture the range of different styles may be challenging for current machine learning models. In another example, it may be difficult to generate a summary of a medical conversation according to a user preferred style due to a lack of training data for each of a plurality of styles different users may prefer.

Additionally, current machine learning models may be ill suited to generate summaries of medical conversations regardless of their style. Generating summaries of medical conversations may require large amounts of high-quality training data that accurately capture the nuances of medical terminology. Obtaining such data that captures the nuances of the medical terminology may be difficult. Moreover, terminology used in medical conversations may be highly complex with numerous technical terms and acronyms that are difficult for models to understand. For example, in medical conversations, meanings of various medical terms may be dynamic and may fluctuate depending on the context. The dynamic nature of medical terms and other complexities of medical conversations may make it challenging for a model to accurately summarize medical conversations. For example, many variables involved in generating a summary of a medical conversation and the specialized terms used in the medical industry may cause inaccurate results when using current machine learning models. Also, due to the importance of accuracy in medical records, a very low (or zero) error rate may be required in medical summaries. For example, misstating a drug dosage in a summary and using such information subsequently may lead to poor patient outcomes. Thus, a highly accurate medical audio summarization service may be needed.

To address these issues and/or other issues, in some embodiments, a medical conversation summarization service may provide a Health Insurance Portability and Accountability Act (HIPAA) eligible conversational intelligence capability trained to understand patient-physician conversations across diverse medical specialties and summarize them according to various styles. In some embodiments, a trained large language model of the medical conversation summarization service may be used to process and understand medical conversations and summarize them according to a user preferred style, selected from a plurality of supported summary styles. A large language model in general may be trained on vast amounts of textual data and be configured to generate coherent and human-like language output (such as sentences and paragraphs). In some embodiments, once trained, the large language model used by the medical conversation summarization service may be further trained on additional amounts of data to update the large language model to generate summaries conforming to preferred styles. In some embodiments, the additional training data may be significantly less that the vast training data initially required. Moreover, in some embodiments, the additional amounts of data may be metadata from user interactions of previously generated summaries. In some embodiments, the medical conversation summarization service may receive an indication of a medical conversation to be summarized with a summary conforming to a given preferred summarization style, selected from a plurality of supported styles. For example, the indication may be provided via a user input interface of the medical conversation summarization service. The indication may include a selection of the preferred summarization style of the user from a set of summarization styles supported by the large language model and/or may include a user provided summary sample of the preferred style of the user. In some embodiments, the indication may include a request to generate a summary of a medical conversation conforming to a preferred style this is included with a medical conversation job packet to be summarized, including audio data and metadata of the medical conversation.

In some embodiments, a model training coordinator of a medical conversation summarization service may train a large language model using medical conversation summaries previously provided as respective outputs of the medical conversation summarization service. For example, the model training coordinator may use summarization style labeled training data that contains user provided edits and/or feedback. In some embodiments, the medical conversation summarization service may receive summary interaction metadata indicating edits made to the summary of the medical conversation conforming to the preferred summarization style of the user, and may use the user provided edits to further train the large language model to generate a summary conforming to a preferred style based on the received summary interaction metadata. For example, the medical conversation summarization service may allow the user to opt into providing metadata regarding edits (e.g., additions, deletions, rearrangements) made by the user to a summary that was generated according to the user's preferred style to further train the large language model on the user's preferred style. In some embodiments, the summary interaction metadata may be used to determine other summarization style labeled training data that may be used to train the large language model.

In some embodiments, user preferences may be provided to a user setting interface to update one or more of the machine learning models of the transcription service and machine learning model(s) for generating the summary. For example, a user may require a specific summary sample, such as a template, and may upload the template to the user setting interface to further train the machine learning model. In another example, a user may upload their own training data including annotated transcripts for training the machine learning model. For example, users, such as physicians practicing in different specialized fields, may desire to have models trained using terms specific to their specialties. In some embodiments, a medical audio summarization service may maintain specialty specific models regardless of whether or not a physician provides practice specific training data. In some embodiments, a medical natural language processing engine of a medical conversation summary service may be trained with annotated versions of medical transcripts generated by a medical transcription engine.

In some embodiments, a transcript of a medical conversation may be generated via a medical transcription service based on audio data included in a medical conversation job packet. In some embodiments, a transcript may be generated while the medical conversation is occurring. For example, audio may be live-streamed (or streamed with a delay) to the medical transcription service while the patient appointment is in progress. The transcription service may receive audio data from the medical conversation and may begin to generate the transcript while continuing to receive audio data from the same medical conversation. The transcript and metadata may be provided to a medical natural language processing service to generate a summary of the medical conversation using the transcript.

Additionally, instead of using a single (or shared) machine learning model, such as a large language model, to perform various tasks involved in summary generation from the transcript, different tasks involved in generating a summary may be separated out into discrete tasks of a workflow performed by multiple models of a medical natural language processing engine. The discrete machine learning models may be trained to perform respective ones of the discrete tasks of the workflow, wherein the discrete machine learning models are trained to perform a narrow task and are also trained using specialized training data (that has been annotated or otherwise marked with received metadata), wherein the specialized training data is based on outputs generated by a preceding task in the workflow, wherein the preceding task uses its own discrete machine learning model specially trained to perform a narrow task involved in the preceding task in the workflow. In some embodiments, to generate a summary of a medical conversation, a large language model may be trained to generate the summary conforming to a preferred style selected from a plurality of available styles. In some embodiments, the large language model and/or one or more of a plurality of specialized machine learning models may be used together to generate a summary conforming to a preferred style as further discussed in FIG. 1.

In some embodiments, a notification report indicating the generation of the summary document may be provided. An application programmatic interface (API) may be implemented for providing the summary for upload to an electronic health record (EHR) service.

As will be appreciated by those skilled in the art, features of a medical conversation summarization service disclosed herein may be implemented in computer systems to solve technical problems in the state of the art and to improve the functioning of the computer systems. For example, as discussed above, and as discussed in more detail below, such features of the medical conversation summarization service may improve medical conversation transcript and summary generation by allowing generation of a summary conforming to a preferred style. This may be achieved, at least in part, by using summarization style labeled training data based on previously provided medical conversation summaries, including summary interaction metadata generated from edits made to the previously provided medical conversation summaries. Such features also improve the functioning of the computer system by facilitating creation of additional summarization styles and/or identification of styles based on a user provided medical summary sample. Also, these features may be used to improve training of a large language model regarding existing supported styles. These and other features and advantages of the disclosed system are discussed in further detail below, in connection with the figures.

FIG. 1 is a block diagram illustrating a medical audio summarization service, wherein a medical transcription service generates a transcript of a medical conversation and a medical natural language processing engine generates a summary document conforming to a preferred summarization style based on the transcript of the medical conversation, according to some embodiments.

In some embodiments, medical audio summarization is performed, such as by a medical audio summarization service 100, and may resemble embodiments as shown in FIG. 1. In some embodiments, an input interface 101 of the medical audio summarization service 100 may receive an indication of a medical conversation 102 to be summarized with a summary conforming to a user preferred style 103. In some embodiments, the input interface 101 may receive an audio file including metadata of a medical conversation. For example, the input interface 101 may receive an audio file of a doctor-patient conversation with metadata indicating that the conversation was in the context of a diabetes diagnosis. In some embodiments, a user, such as a physician, may upload a clinical visit audio between a patient and the physician to the input interface 101 in order to generate a transcript and a summary based on the audio. The input interface 101 may provide the audio file to an audio storage 104 and also provide the metadata for the audio file to a metadata managing system 106. In some embodiments, a user of the medical audio summarization service 100 may indicate the medical conversation 102 is to be summarized according to a preferred style by indicating a stored audio file in the audio storage 104 for the medical audio summarization service 100 to summarize along with an indication of the preferred style. In some embodiments, the indication of the medical conversation 102 to be summarized with the summary conforming to the user preferred summarization style 103 may be a selection of the preferred summarization style from a set of available summarization styles. For example, the user may select as the user preferred style, the preferred style 103. For example, the style selection may be performed using a dropdown menu of the input interface 101 that displays a list of available summarization styles. In some embodiments, the preferred summarization style may be indicated using a user provided summary sample. For example, the input interface 101 may be configured to allow a user to upload (or otherwise indicate an uploaded one of) a medical conversation summary sample as an indication of the user preferred style 103. In some embodiments, the input interface 101 may classify the user provided sample as one of a set of available summarization styles, wherein the classified style is used as the user preferred style 103. In some embodiments, the available summarization styles may be styles that a large language model 136 of a summarization module 140 has been trained to generate. For example, the available summarization styles may be summarization styles 138 that the large language model 136 of the summarization module 140 has been trained to generate. In some embodiments, a user setting interface 108 may receive user preferences and/or user provided training data. For example, a user may indicate one or more summarization preference settings including a preferred style to be used as a default preferred style in the absence of a style selection and/or a user provided summary sample. In some embodiments, a customer may provide a sample medical conversation summary to use as the default preferred style, wherein summaries generated by the medical audio summarization service 100 are generated based on the user provided sample. The use of a user provided sample to determine a preferred style of the summary that is generated by the medical audio summarization service 100 is further discussed in FIG. 4 and FIGS. 5A-5C.

In some embodiments, the input interface 101 may receive an indication of a medical conversation to be summarized and generate a job request, requesting a summary be generated for the medical conversation. The medical audio summarization service 100 may send the job request to a medical transcription engine 110. Once the medical transcription engine 110 receives the job request, the medical transcription engine 110 may access the audio file and the metadata of the medical conversation from the audio storage 104 and the metadata managing system 106, respectively. A control plane 112 may send the job request to be queued to a job queue 114. The audio processor 116 may then process the job request from the job queue 114 and generate a transcript of the medical conversation. In some embodiments, the results may be provided to the post-processing transcription 118 for post-processing before providing a results notification 120. The results notification 120 indicating generation of the transcript may be provided to the medical natural language processing engine 122. In some embodiments, a first amount of audio data of the medical conversation may be provided to the medical transcription engine 110, while the patient and physician are still talking and generating a second (or subsequent) amount of the audio data. For example, the medical conversation may be provided to the medical transcription engine 110 as an audio input stream. The transcript may be generated based on the first amount of audio data and the medical transcription engine 110 may receive the second amount of the audio data while continuing to generate the transcript. For example, the transcript may be generated during a clinical visit.

In some embodiments, in a case where the physician is a specialist in a specific field, the physician may want to train the medical transcription engine 110 and/or the medical natural language processing engine 122 with their own labeled training data. In such a case, the specialist may upload transcripts from their specific field to tailor the engine(s) to the specific field. The newly updated medical transcription engine 110 and the newly updated medical natural language processing engine 122 may better recognize specific terms from the specific field and improve the quality of a generated transcript and generated summary for the specialist. Use of medical specialty context for the medical audio summarization service 100 is further discussed in FIG. 3.

In some embodiments, a medical natural language processing engine 122 may receive notification of a job request to generate a summary conforming to a user preferred style selected from a set of available styles. The medical natural language processing engine 122 may also receive the transcript needed for the job request via a transcript retrieval interface 124. Notification of the job request and the transcript may be provided to a control plane 126 for the medical natural language processing engine 122 and the job request and transcript may be provided to a job queue 128. A workflow processing engine 130 may be instantiated by the control plane 126 and may receive the job request and the transcript from the job queue 128. In some embodiments, the workflow processing engine 130 may then invoke machine learning models such as a medical entity detection model 132 to identify medical entities and a role identification model 134 to identify speaker roles, wherein the medical entity detection model 132 and the role identification model 134 are discretely trained for the specific entity detection/role identification. The workflow processing engine 130 may also invoke the large language model 136 to generate a summary, wherein the large language model takes as inputs outputs generated using the previous models. For example, summary inferences may be generated using the large language model 136 and a transcript that has been marked with medical entities and speaker roles using the medical entity detection model 132 and the role identification model 134.

In some embodiments, a computing instance instantiated as a workflow processing engine 130 may access respective ones of the models to perform discrete tasks, such as medical entity detection, role identification, and various summarization tasks, such as sectioning, extraction, and abstraction. The workflow processing engine 130 may merge results from each task into a current version of the transcript that is being updated as the discrete tasks are performed. The currently updated (and merged) version of the transcript may be used as an input to perform respective ones of the subsequent discrete tasks. For example, in some embodiments, the workflow processing engine 130 may merge the results from a task performed using a prior model with the transcript and use the merged transcript to determine results for a task that uses the next model. For example, a workflow worker instance of the workflow processing engine 130 may invoke a medical entity detection model 132 to identify medical entities in a transcript. The results may then be merged with the transcript to include in the original transcript the identified medical entities. The workflow worker instance may then invoke the role identification model 134 to identify speaker roles in the merged transcript. The identified speaker role results may then be merged with the merged transcript to include the identified medical entities and identified speaker roles. In some embodiments, the large language model 136 may generate a summary based on the updated version of the transcript. For example, the workflow processing engine 130 may orchestrate tasks performed by worker nodes using the large language model 136 to generate a summary conforming to the preferred style of the user, selected from a plurality of supported summary styles, wherein the large language model 136 uses the merged transcript as an input.

In some embodiments, the respective machine learning models may be used in different orders, but may be trained in whichever order the machine learning models are to be used. For example, in some embodiments, speaker role identification may be performed before medical entity identification, but in such a case, the medical entity identification model may be trained using training data this is output from the speaker role identification task. In other embodiments, medical entity identification may be performed prior to speaker role identification, in which case the speaker role identification model may be trained using training data that is output from the medical entity identification task. In some embodiments, the transcript may be merged with the results of a preceding model before being used for a future model.

In some embodiments, the language model 136 may perform one or more of the discrete tasks discussed above (such as medical entity detection, role identification, etc.) update to the transcript. The large language model 136 may perform multiple ones of a set of discrete tasks, such as sectioning, extraction, and abstraction, as a single script modification task. In some embodiments, the large language model 136 may perform additional ones of the discrete tasks discussed above, such as medical entity detection and role identification, and, in which case, directly use the transcript from the medical transcription engine 110 to generate the summary.

In some embodiments, a model training coordinator 142 may be used for training the machine learning models with labeled training data, such as annotated transcripts. The model training coordinator 142 may use summarization style labeled training data 143 that comprise previously provided summaries 144 and summary interaction metadata 145 to train the large language model 136. Training of the large language model 136 is further discussed in detail in regard to FIG. 4. In some embodiments, the model training coordinator 142 may be used offline.

Once the summary is generated, the workflow processing engine 130 may provide the generated summary to an output interface 146. The output interface 146 may notify the customer of the completed job request. In some embodiments, the output interface may provide a notification of a completed job to the output API 148. In some embodiments, the output API 148 may be implemented to provide the summary for upload to an electronic health record (EHR) or may push the summary out to an electronic health record (EHR), in response to a notification of a completed job.

Figure 2:
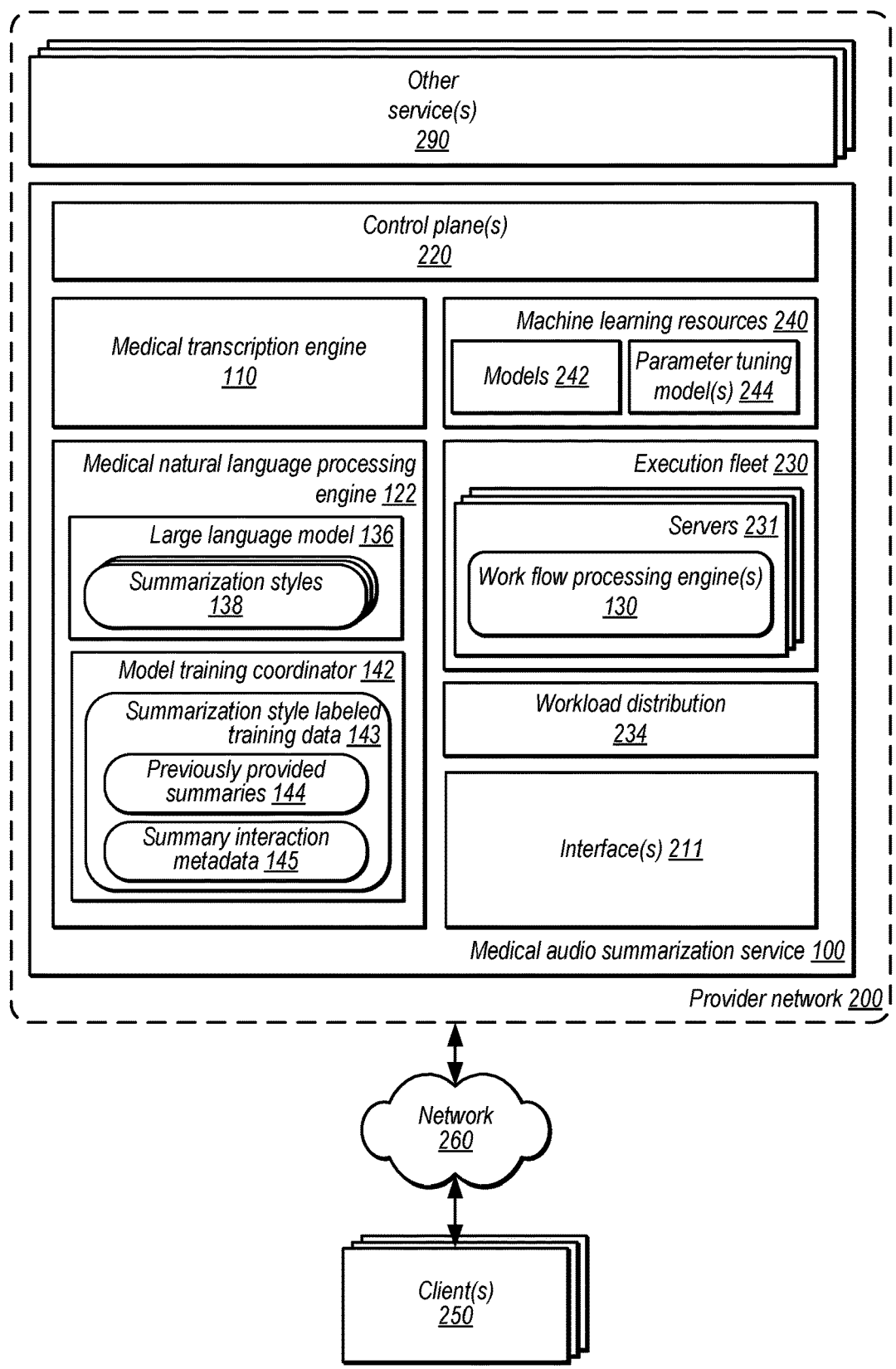
FIG. 2 illustrates an example medical audio summarization service that uses summarization style labeled training data to train one or more models to generate a summary document conforming to a preferred summarization style, according to some embodiments.

FIG. 2 illustrates an example medical audio summarization service that uses summarization style labeled training data to train one or more models to generate a summary document conforming to a preferred summarization style, according to some embodiments.

In some embodiments, a provider network 200 may be a private or closed system or may be set up by an entity such as a company or a public sector organization to provide one or more services (such as various types of cloud-based storage or computing services) accessible via the Internet and/or other networks to clients 250, in some embodiments. The provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200. For example, the provider network 200 may implement various computing resources or services, such as a medical audio summarization service 100, and/or any other type of network-based services 290 (which may include a virtual compute service and various other types of storage, database or data processing, analysis, communication, event handling, visualization, data cataloging, data ingestion (e.g., ETL), and security services), in some embodiments.

In various embodiments, the medical audio summarization service 100 may implement interface(s) 211 to allow clients (e.g., client(s) 250 or clients implemented internally within provider network 200, such as a client application hosted on another provider network service like an event driven code execution service or virtual compute service) to interact with the medical audio summarization service 100. The interface(s) 211 may be one or more of graphical user interfaces, programmatic interfaces that implement Application Program Interfaces (APIs) and/or command line interfaces, such as input interface 101, user setting interface 108, output interface 146, and/or output APIs 148, for example as shown in FIG. 1.

In at least some embodiments, workflow processing engine(s) 130 may be implemented on servers 231 to initiate tasks for a medical transcription engine 110 and a medical natural processing engine 122. The workload distribution 234, comprising one or more computing devices, may be responsible for selecting the particular server 231 in execution fleet 230 that is to be used to implement a workflow engine to be used to perform a given job. The medical audio summarization service 100 may implement control plane(s) 220 to perform various control operations to implement the features of medical audio summarization service 100, such as control plane 112 and control plane 126 in FIG. 1. For example, the control plane(s) 220 may monitor the health and performance of workers used to perform tasks to service requests at different components, such as workload distribution 234, servers 231, machine learning resources 240, the medical transcription engine 110, and the medical natural language processing engine 122. The control plane 220 may, in some embodiments, arbitrate, balance, select, or dispatch requests to different components in various embodiments.

The medical audio summarization service 100 may utilize machine learning resources 240. The machine learning resources 240 may include parameter tuning model 244 and models 242 such as the medical entity detection model 132, the role identification model 134, and the large language model 136, for example as shown in FIG. 1. In some embodiments, one or more machine learning-based parameter tuning models 244 may be used to adjust the models during training and adjust one or more of the models 242.

Generally speaking, clients 250 may encompass any type of client that can submit network-based requests to provider network 200 via network 260, including requests for the medical audio summarization service 100 (e.g., a request to generate a transcript and summary of a medical conversation). For example, a given client 250 may include a suitable version of a web browser, or may include a plug-in module or other type of code module that can execute as an extension to or within an execution environment provided by a web browser.

In some embodiments, a client 250 may provide access to provider network 200 to other applications in a manner that is transparent to those applications. Clients 250 may convey network-based services requests (e.g., requests to interact with services like medical audio summarization service 100) via network 260, in some embodiments. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between the given client 250 and the Internet as well as between the Internet and provider network 200. It is noted that in some embodiments, clients 250 may communicate with provider network 200 using a private network rather than the public Internet.

Figure 3:
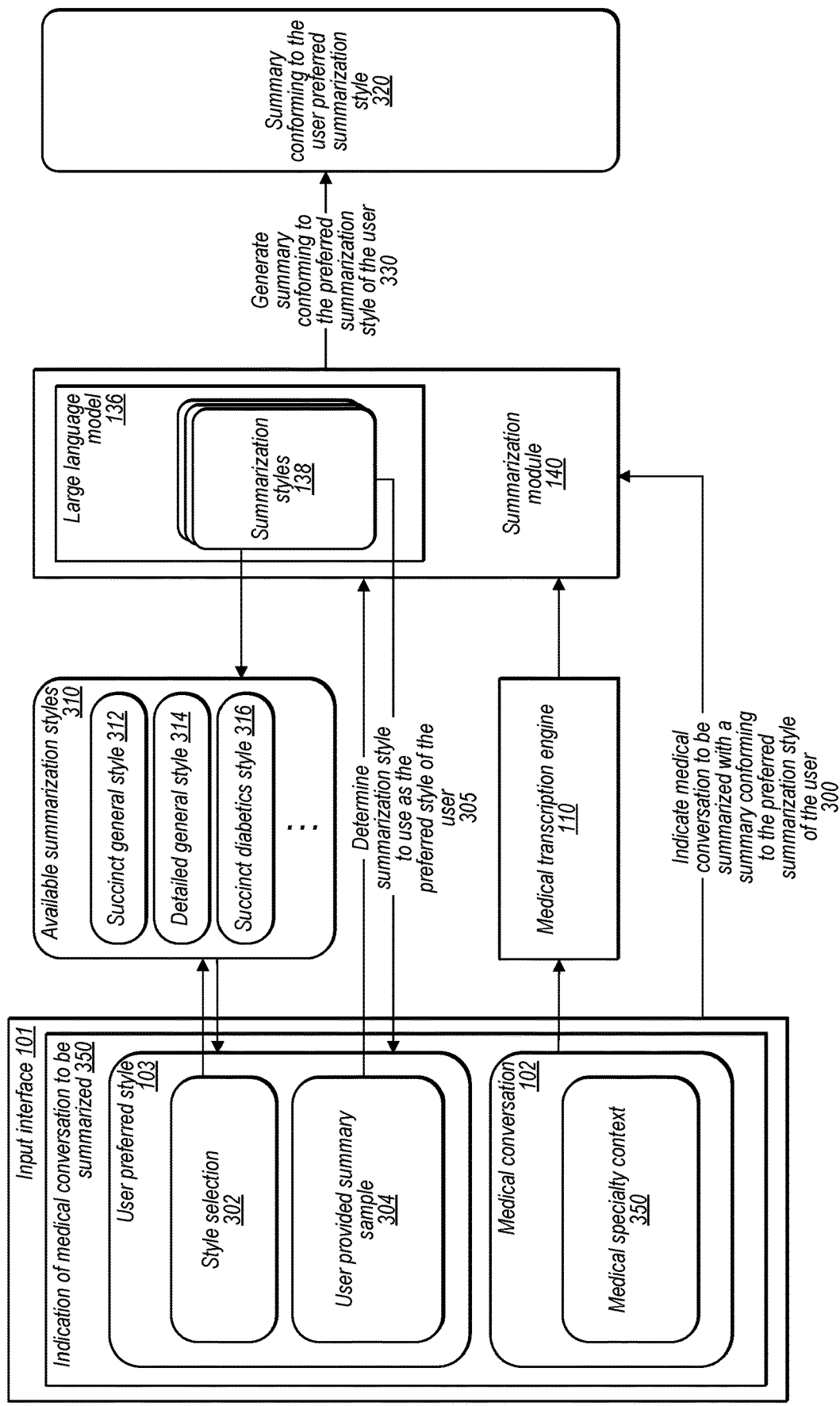
FIG. 3 illustrates a high-level view of components of a medical audio summarization service that receives an indication of a medical conversation to be summarized and generates, based on the indication, a summary conforming to a preferred summarization style of a user of the medical audio summarization service, according to some embodiments.

FIG. 3 illustrates a high-level view of components of a medical audio summarization service that receives an indication of a medical conversation to be summarized and generates, based on the indication, a summary conforming to a preferred summarization style of a user of the medical audio summarization service, according to some embodiments.

In some embodiments, an indication of medical conversation to be summarized 350 may be received by a summarization module 140 for processing via an input interface 101. The indication of the medical conversation to be summarized 350 may comprise an indication of the medical conversation 102 and an indication of a user preferred style 103. As discussed in FIG. 1, the medical conversation 102 may be indicated through an audio file of the medical conversation 102 and/or may be a selection from a stored audio recording in an audio storage, in some embodiments. Moreover, as discussed in FIG. 1, the medical conversation 102 may be provided to a medical transcription engine 110 to generate a transcript of the medical conversation 102 that will be used to generate a summary conforming to a preferred summarization style, selected from a plurality of supported summary styles. In some embodiments, the medical conversation 102 may be associated with a medical specialty context 350. For example, the medical specialty context 350 may indicate that the medical conversation 102 was recorded in a clinic specializing in cardiology. The medical specialty context 350 may be provided to the medical transcription engine 110 or may be classified by the medical transcription engine 110 itself. In some embodiments, the medical specialty context 350 may be indicated to the medical transcription engine 110 as a metadata of the audio file of the medical conversation 102.

In some embodiments, the indication of the medical conversation may comprise an indication of the user preferred style 103. The user preferred style 103 may comprise a style selection 302 from a set of available summarization styles 310. For example, the user preferred style 103 may be selected from the available summarization styles 310 (e.g., a succinct general style 312, a detailed general style 314, a succinct diabetics style 316, etc.), wherein the available summarization styles 310 are summarization styles 138 for which a large language model 136 of the summarization module 140 has been trained. In some embodiments, the summarization styles 138 may be characterized using different criteria. For example, the summarization styles 138 may vary based on linguistic characteristics, medical specialty, purpose, intended audience, and specific medical condition. In another example, the succinct general style 312 may provide a brief overview of the patient's medical history, current condition, and relevant treatment plans as a concise summary (without delving into excessive details). The succinct diabetics style 316 may focus on summarizing information related to diabetes and provide a condensed summary of a patient's diabetic history, including their blood sugar levels, treatment regimen, complications, and recommended lifestyle modifications which are specific to diabetes.

In some embodiments, the indication of the user preferred style 103 may be a user provided summary sample 304. For example, the user may provide a summary sample 304, such as a medical conversation template that contains headings and section divisions of the style that the user prefers. As another example, the user may provide a medical conversation summary that was created by the user that has a summary style that the user prefers. In response to receiving the indication of the user preferred style 103, the summarization module 140 (and/or another component of a medical audio summarization service) may determine the summarization style to use as the preferred style of the user 305. For example, the preferred style may be determined as the selected style from the available summarization styles 310. In some embodiments, the user provided summary sample 304 may be classified as one of the available summarization styles 310, wherein the classified/selected one of the available summarization styles 310 is used as the preferred style of the user 305. The use of the user provided summary sample 304 to determine the user preferred style will be further discussed in FIGS. 5A-5C.

The large language model 136 of the summarization module 140 uses the transcript generated by the medical transcription engine 110 of the medical conversation 102 and determines the preferred style of the user 103 to generate a summary conforming to the preferred summarization style of the user (e.g., perform summary generation 330). In some embodiments, a summary conforming to the user preferred summarization style 320 may be provided to a user for subsequent user interaction feedback that may be used to train the large language model, and will be further discussed in FIG. 4.

Figure 4:
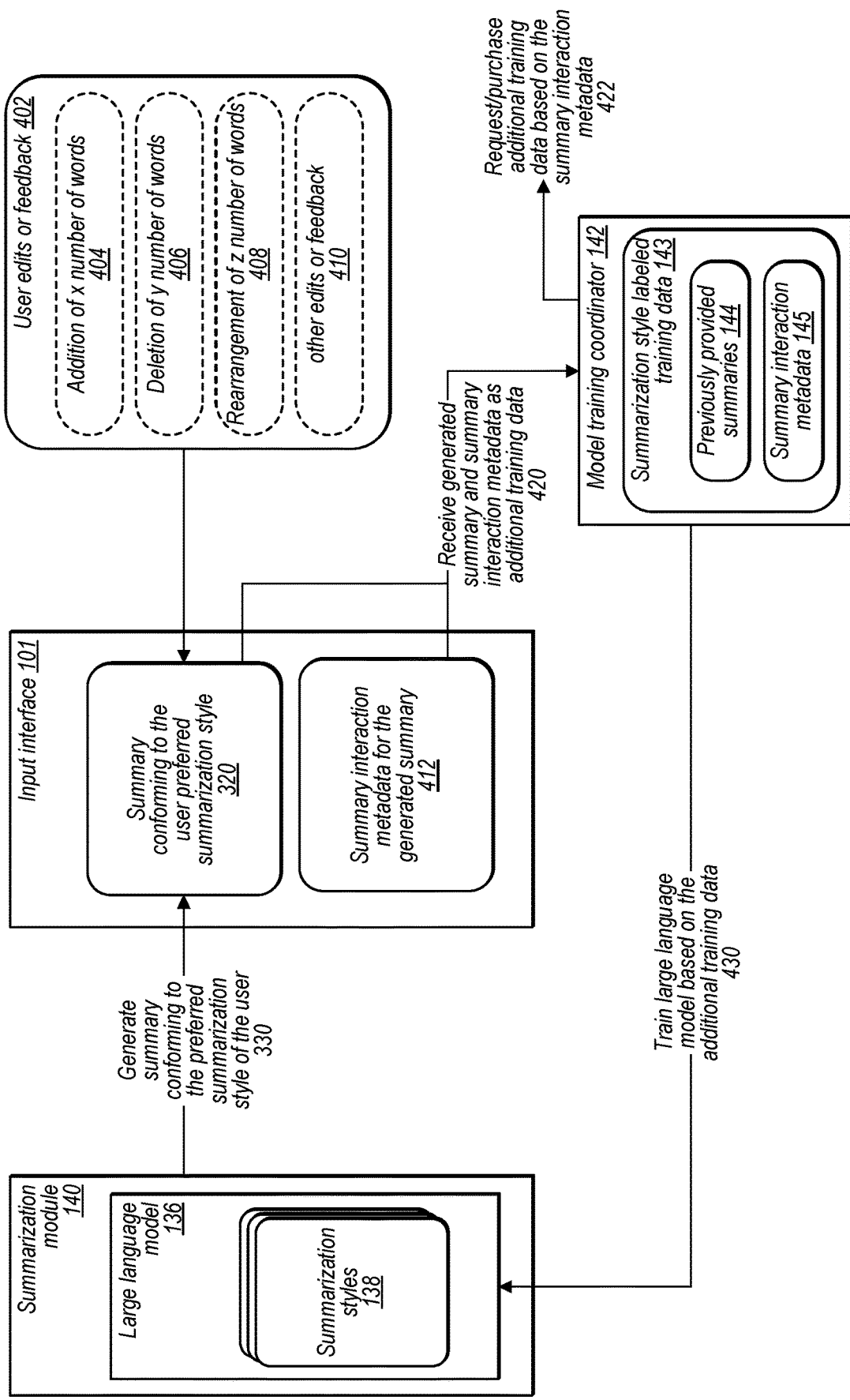
FIG. 4 illustrates a high-level view of components of a medical audio summarization service that receives user edits and/or feedback for a previously generated summary and trains a large language model of a summarization module of the medical audio summarization service based on summary interaction metadata generated from the user edits and/or feedback, according to some embodiments.

FIG. 4 illustrates a high-level view of components of a medical audio summarization service that receives user edits and/or feedback for a previously generated summary and trains a large language model of the summarization module based on summary interaction metadata generated from the user edits and/or feedback, according to some embodiments.

In some embodiments, a summarization module 140 may generate a summary conforming to the preferred summarization style of the user 330 selected from a plurality of supported summary styles as discussed above in FIGS. 1-3. In some embodiments, an input interface 101 may provide a summary conforming to the user preferred style 320 to a user to obtain additional information. For example, the user may provide, using the input interface 101, one or more user edits or feedback 402. The user edits or feedback 402 may comprise addition of x number of words 404, deletion of y number of words 406, rearrangement of z number of words 408, and/or other edits or feedback 410. For example, the user may determine that the summary conforming to the user preferred summarization style 320 is too lengthy and therefore delete y number of words to reduce the length. In another example, the user may rearrange one or more portions of the summary conforming to the user preferred summarization style 320 to adjust the summary to better conform to the user indicated style. In some embodiments, the user edits may comprise one or more user additions that lengthen the summary.

Based on the user edits or feedback 402, the medical audio summary service may determine summary interaction metadata for the generated summary 412 based on the user edits or feedback 402. The metadata is generated with the user's consent. In some embodiments, the summary interaction metadata for the generated summary 412 generated from the user edits or feedback 402 may conform to HIPAA standards or other standards for personally identifiable information (PII). For example, the user edits or feedback 402 may be clickstream data and the summary interaction metadata 412 generated from the clickstream data may not contain any personally identifiable information. In some embodiments, the summary interaction metadata 412 may include other kinds of metadata, such as duration of time that the summary was edited or sub-section of the summary that was edited, or durations of time particular sections were viewed or edited.

In some embodiments, the summary conforming to the user preferred summarization style 320 and the summary interaction metadata for the generated summary 412 may be used by a model training coordinator 142 to update the large language model 136. For example, the model training coordinator 142 may receive the generated summary and summary interaction metadata as additional training data 420, and train the large language model based on the additional training data 430. For example, based on summary interaction metadata for the generated summary 412 comprising user edits 402 that lengthen (or shorten) the summary, the large language model 136 may be trained to adjust the preferred summarization style of the user to include a lengthened (or shortened) summary style. In another example, based on summary interaction metadata for the generated summary 412 comprising user edits 402 that rearrange information in the summary, the large language model 136 may be trained to adjust the preferred summarization style of the user to alter arrangement of information. In some embodiments, the summarization style labeled training data 143 comprising previously provided summaries 144 and summary interaction metadata 145 may be obtained via the summary generation and summary interaction metadata generation discussed above in FIGS. 1-3.

In some embodiments, based on the received generated summary and summary interaction metadata, the model training coordinator 142 may determine that other labeled training data for a given summarization style is needed to be used in training the large language model. For example, based on summary interaction metadata indicating that a large number of edits have been made at a certain sub-section of the summary, the model training coordinator 142 may determine that additional training data directed towards the certain sub-section is required. In some embodiments, the additional training data may be purchased from one or more vendors as determined, at least in part, based on the additional training metadata determined to be needed. The model training coordinator may request and/or purchase the additional training data based on the summary interaction metadata 422.

Figure 5A:
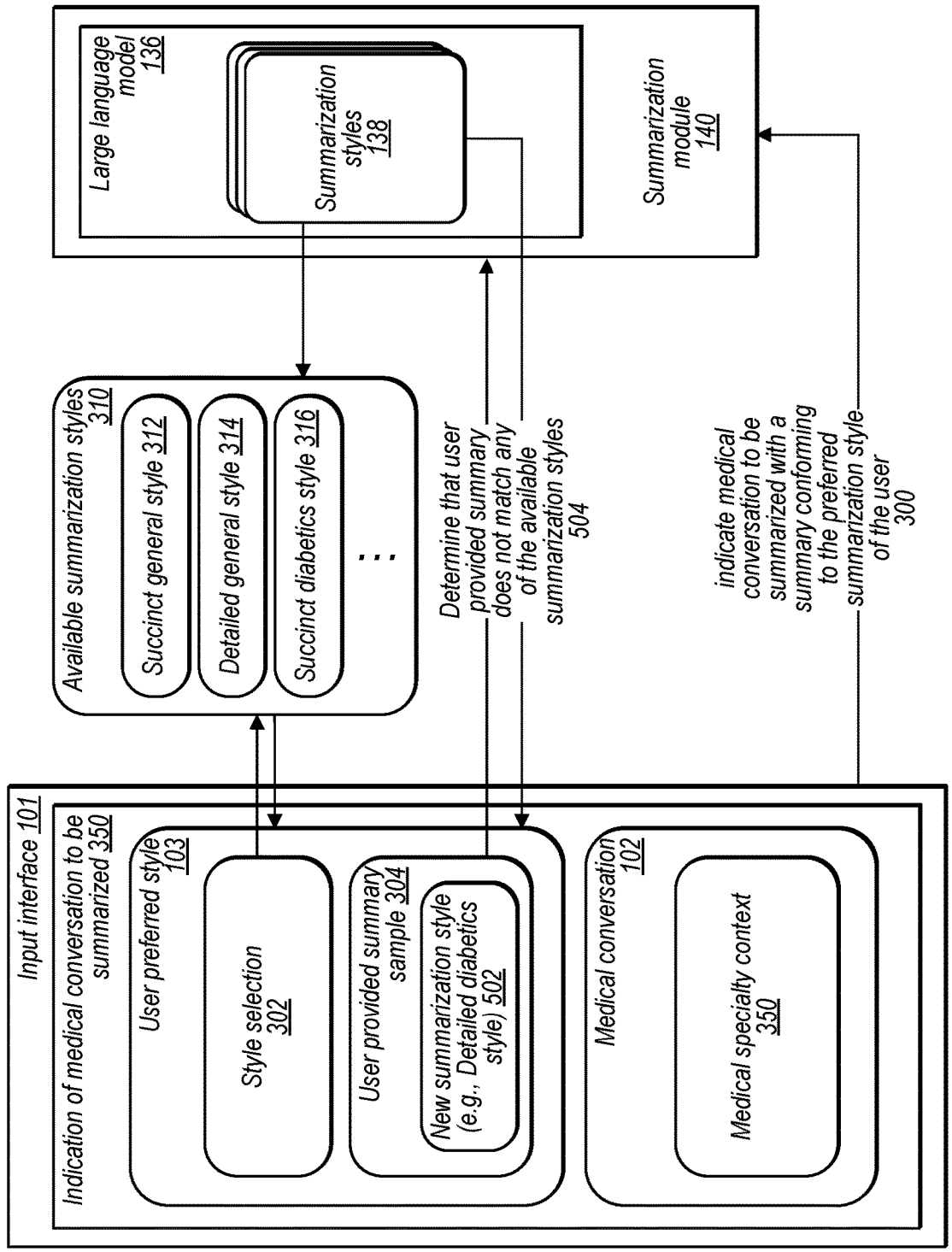
FIG. 5A illustrates a more detailed view of an example summarization module of a medical audio summarization service that is configured to determine whether a user provided summary sample matches any of a plurality of available summarization styles supported by the medical audio summarization service, according to some embodiments.

FIG. 5A illustrates a more detailed view of an example summarization module of a medical audio summarization service that is configured to determine whether a user provided summary sample matches any of a plurality of available summarization styles supported by the medical audio summarization service, according to some embodiments.

As discussed in FIGS. 1 and 3, an input interface 101 of a medical audio summarization service may indicate a medical conversation to be summarized with a summary conforming to the preferred summarization style of the user 300, wherein the summarization performed by a summarization module 140. In some embodiments, an indication of medical conversation to be summarized 350 may comprise an indication of a user preferred style 103 for a new summarization style that is not part of an available set of summarization styles in the summarization styles 310 and for which a large language model 136 has not yet been trained for. For example, a user may request a style selection 302 for a "Detailed diabetics style" that is not available in the available summarization styles 310. In some embodiments, a user provided summary sample 304 may have a new summarization style 502, such as a "Detailed diabetics style", wherein the new summarization style 502 may not be classified as one of the available summarization styles 310. In some embodiments, the user provided summary sample 304 may be used as the preferred style and further used to train the large language model on a new preferred style. For example, based on a received user preferred style 103, a summarization module 140 may use clustering algorithms and/or other classification techniques and determine that the user provided summary does not match any of the available summarization styles 540. In some embodiments, the summarization style of the user provided summary sample 304 may fail to meet a threshold level of similarity to one of the available summarization styles 310. The user may indicate (as part of the indication of medical conversation to be summarized 350) the threshold level of similarity required. In some embodiments, the summarization module 140 may indicate a request to add the new summarization style 502 and train the large language model 136 with the new summarization style 502, and therefore may not require classification of the new summarization style 502 into one of the available summarization styles 310.

Figure 5B:
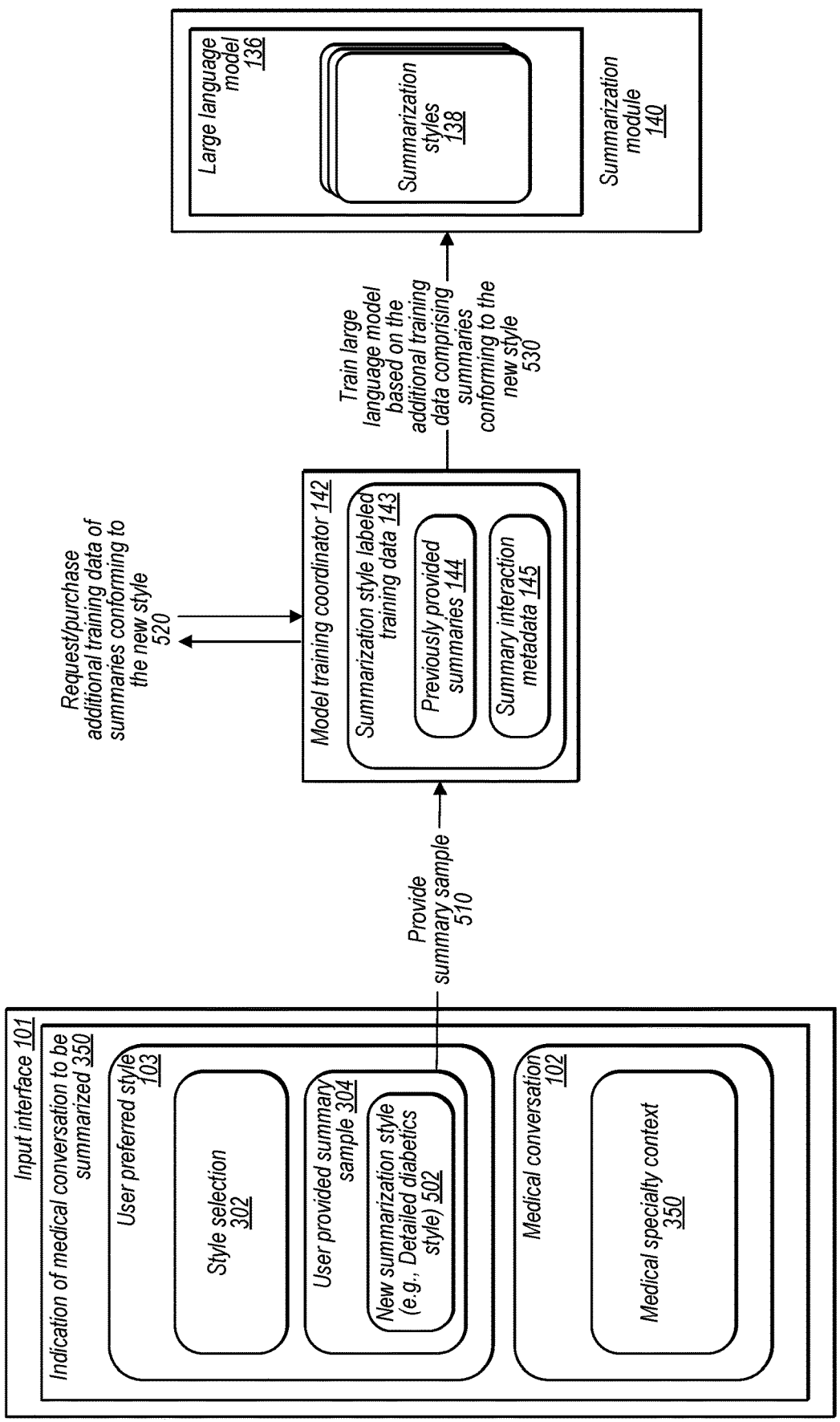
FIG. 5B illustrates a more detailed view of an example model training coordinator of the medical audio summarization service that uses a user provided summary sample and in response to determining the user provided summary sample does not match any of a plurality of existing supported summarization styles, requests additional training data of summaries conforming to a new style to be created based on the user provide summary sample, wherein the model training coordinator further trains a large language model of a summarization module of the medical audio summarization service based on the additional training data of the summaries conforming to the new style, according to some embodiments.

FIG. 5B illustrates a more detailed view of an example model training coordinator of the medical audio summarization service that uses a user provided summary sample and in response to determining the user provided summary sample does not match any of a plurality of existing supported summarization styles, requests additional training data of summaries conforming to a new style to be created based on the user provide summary sample, and trains a large language model of a summarization module based on the additional training data of the summaries conforming to the new style, according to some embodiments.

In some embodiments, based on the determination that the user provided summary does not match any of the available summarization styles 504, the input interface 101 may provide the summary sample 510 to the model training coordinator 142. The model training coordinator 142 may use the user provided summary sample 304 to determine additional training data needed to train the large language model to generate summaries conforming to the new style. For example, the model training coordinator 142 may apply one or more clustering algorithms and/or perform classification techniques to a set of available medical summaries and associated medical conversation audio file to determines which of the set of available medical summaries have a summarization style that is similar to the new summarization style 502. The model training coordinator 142 may use the determined ones of the set of available medial summaries that are like the summary sample as an additional set of training data.

In some embodiments, the model training coordinator 142 may classify the summary sample into a summarization style that training data is labeled with. For example, the model training coordinator 142 may determine that the new summarization style 502 conforms to a "Detailed diabetics style" for which there are ground-truth medical summaries (of the additional training data) that is labeled as the "Detailed diabetics style". The model training coordinator 142 may request/purchase additional training data of summaries conforming to the new summarization style 520. For example, the model training coordinator 142 may select from a repository of available training data, a set of training data conforming to the new summarization style 502 as determined by the model training coordinator 142. In some embodiments, the model training coordinator 142 may train the large language model based on the additional training data that comprises summaries conforming to the new style 530 based on the provided summary sample 510.

Figure 5C:
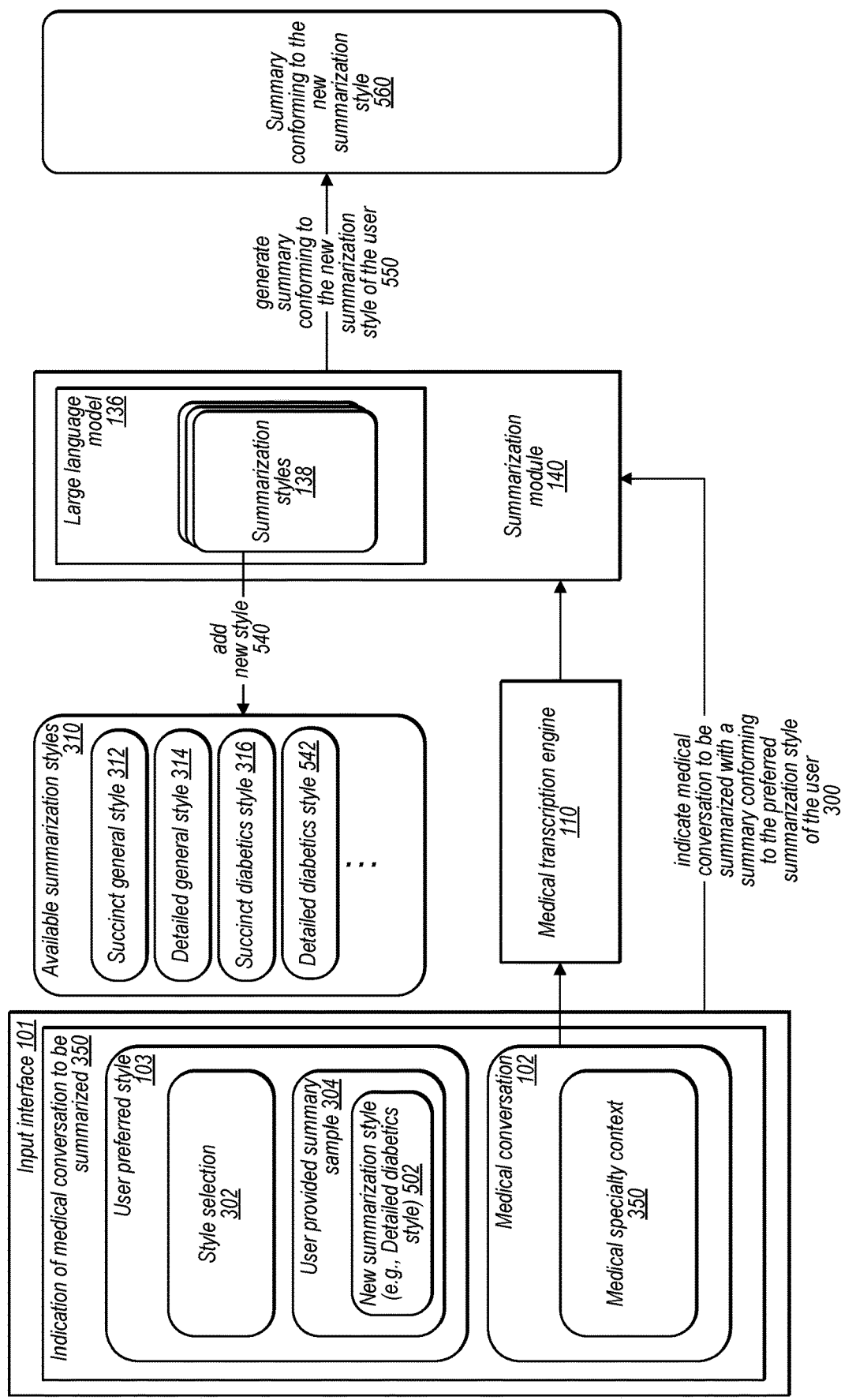
FIG. 5C illustrates a more detailed view of an example summarization module of the medical audio summarization service that uses a large language model that was previously trained based on the additional training data of the summaries conforming to the new style to generate a summary conforming to the new style, according to some embodiments.

FIG. 5C illustrates a more detailed view of a summarization module of a medical audio summarization service that uses a large language model of the summarization module that was previously trained based on the additional training data of the summaries conforming to a new style to generate a summary conforming to the new style, according to some embodiments.

In some embodiments, the summarization module 140 may add the new style 540 (for which the large language model 136 has been trained as discussed in FIGS. 5A-5B). Upon training of the large language model 136 with the new summarization style 502, the set of available summarization styles 310 may be augmented to include the added new style. For example, based on the training of the large language model 136 with the detailed diabetics style that was not available prior to the training of the large language model 136 as described in FIG. 5B, the detailed diabetics style 542 may be added to a dropdown menu of available summarization styles. Subsequent to the training of the large language model 136 with the new summarization style 502, the summarization module may generate a summary conforming to the new summarization style of the user 550 as discussed in FIG. 1. For example, the input interface 101 may indicate a medical conversation is to be summarized with a summary conforming to the preferred summarization style of user 300, wherein the preferred summarization style is the new style (e.g., Detailed diabetics style 542). Based on the indication, the summarization module 140 may generate a summary conforming to the new summarization style 560 (e.g., Detailed diabetics style).

FIG. 6 is a block diagram illustrating medical entities in a transcript of a medical conversation, a workflow for generating a summary of the medical conversation, and a process of detecting medical entities in the transcript of the medical conversation, according to some embodiments.

Some embodiments, such as shown in FIGS. 1-5, may include further features, such as shown in FIG. 6. In some embodiments, a workflow for generating a summary of a transcript for a medical conversation may involve machine learning models including a medical entity detection model, a role identification model, a sectioning model, and a large language model. An engine, such as the workflow processing engine 130 from FIG. 1, may utilize the medical entity detection model to analyze the transcript of the medical conversation and detect medical terms such as gastroenteritis or colitis as shown in the transcript of the medical conversation in FIG. 4 identified by a box around the terms. Medical terms may include but are not limited to medicines, disease names, or scientific phrases used in the medical field.

In block 600, a notification of a medical conversation transcript to be processed may be received. For example, the transcript retrieval interface 124 shown in FIG. 1 may receive such a notification. In block 602, a natural language processing job may be added to a job queue, such as the job queue 128 in FIG. 1, and a workflow worker instance may be assigned for the job, such as the workflow processing engine 130 in FIG. 1. In block 604, the medical conversation transcript may be submitted by the workflow worker instance to the medical entity detection model. In block 606, the results from the medical entity detection model may be determined. An example of results includes the identified medical entities "gastroenteritis or colitis" in the transcript of the medical conversation shown in FIG. 6. In block 608, the results may be merged with the medical conversation transcript so the merged transcript includes the original transcript and the identified medical entities.

Figure 7:
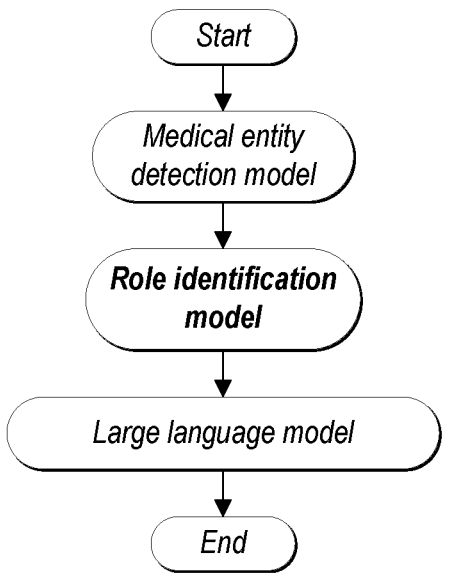
FIG. 7 is a block diagram illustrating speaker roles in a transcript of a medical conversation, a workflow for generating a summary of the medical conversation, and a process of identifying speaker roles in the transcript of the medical conversation, according to some embodiments.

FIG. 7 is a block diagram illustrating speaker roles in a transcript of a medical conversation, a workflow for generating a summary of the medical conversation, and a process of identifying speaker roles in the transcript of the medical conversation, according to some embodiments.

Some embodiments, such as shown in FIGS. 1-6 may include further features, such as shown in FIG. 7. In some embodiments, a workflow for generating a summary of a transcript for a medical conversation may involve machine learning models including a medical entity detection model, a role identification model, a sectioning model, and a large language model. An engine, such as the workflow processing engine 130 from FIG. 1, may utilize the role identification model to analyze the transcript of the medical conversation and identify the speakers in a transcript as a physician or patient as shown in the merged transcript of the medical conversation in FIG. 7. The speaker roles may be identified by examining the sentences of each speaker. In some embodiments, a merged transcript including results from a preceding model may be used to aid the role identification model in determining the speaker roles. For example, the role identification model may have been in trained in a way that assumes a physician would state more medical entities than a patient and may use this training to determine which speaker is the physician.

In block 700, the merged medical conversation transcript (from block 608) may be submitted by the workflow worker instance to the role identification model. In block 702, the results from the role identification model may be received. An example of results includes the identified physician and patient roles bolded in the transcript of the medical conversation shown in FIG. 7. In block 704, the results may be merged with the merged medical conversation transcript so the merged transcript includes the original transcript, the identified medical entities, and the identified speaker roles. As discussed in FIG. 1-2, in some embodiments, a large language model may perform the respective detection of medical entities illustrated in FIG. 6 and/or the role detection illustrated in FIG. 7.

FIG. 8A is a block diagram illustrating an annotated transcript of a medical conversation indicating identified medical entities, identified speaker roles, labeled sections, and extracted phrases of the transcript and a generated summary conforming to a user preferred "detailed" summarization style, according to some embodiments.

Some embodiments, such as shown in FIGS. 1-7 may include further features, such as shown in FIG. 8A. An example of a merged transcript of a medical conversation and a generated summary for the transcript having a "detailed" summarization style may be shown in FIG. 8A. In some embodiments, extracted phrases of a section of the merged transcript may be added to the corresponding section of the generated summary, such as shown in FIG. 8A. In some embodiments, the generated summary may take phrases from the transcript and include them into the summary. The extracted phrases may be reworded into coherent complete sentences for the generated summary using the results of the speaker roles and the medical entities detection steps. In some embodiments, the generated summary may include abstracted phrases. In some embodiments, the generated summary may conform to a user preferred detailed summarization style. For example, the summary may be provided in a verbose manner. The summary in the detailed style may contain features such as complete sentences and verbose patient history and treatment plan sub-sections.

FIG. 8B is a block diagram illustrating an annotated transcript of a medical conversation indicating identified medical entities, identified speaker roles, labeled sections, and extracted phrases of the transcript and a generated summary conforming to a user preferred "succinct" summarization style, according to some embodiments.

An example of a merged transcript of a medical conversation and a generated summary for the transcript having a "succinct" summarization style may be shown in FIG. 8B. In some embodiments, similar to FIG. 8A, the extracted phrases may be reworded into the generated summary using the results of the speaker roles and the medical entities. Factual information included in the succinct summary may be similar (or identical) to that shown in FIG. 8A for the detailed summarization style, but the style in which the information is communicated may be different. For example, the summary may be provided in a succinct manner and may include features such as brief, incomplete sentences that describe the patient history and treatment plan.

FIG. 8C is a block diagram illustrating an annotated transcript of a medical conversation and generated sub-sections of a summary of the medical conversation conforming to respective user preferred sub-section summarization styles, according to some embodiments.

An example of a merged transcript of a medical conversation and a generated summary for the transcript having a "detailed" summarization style for patient history subsection and a "succinct" summarization style for assessment and treatment plan sub-sections are shown in FIG. 8C. In some embodiments, different portions of the sub-section may conform to different summarization styles. Although FIG. 8C illustrates two different styles being used, this is by way of illustration and more than two different styles may be used for different sub-sections of a summary.

Figure 9:
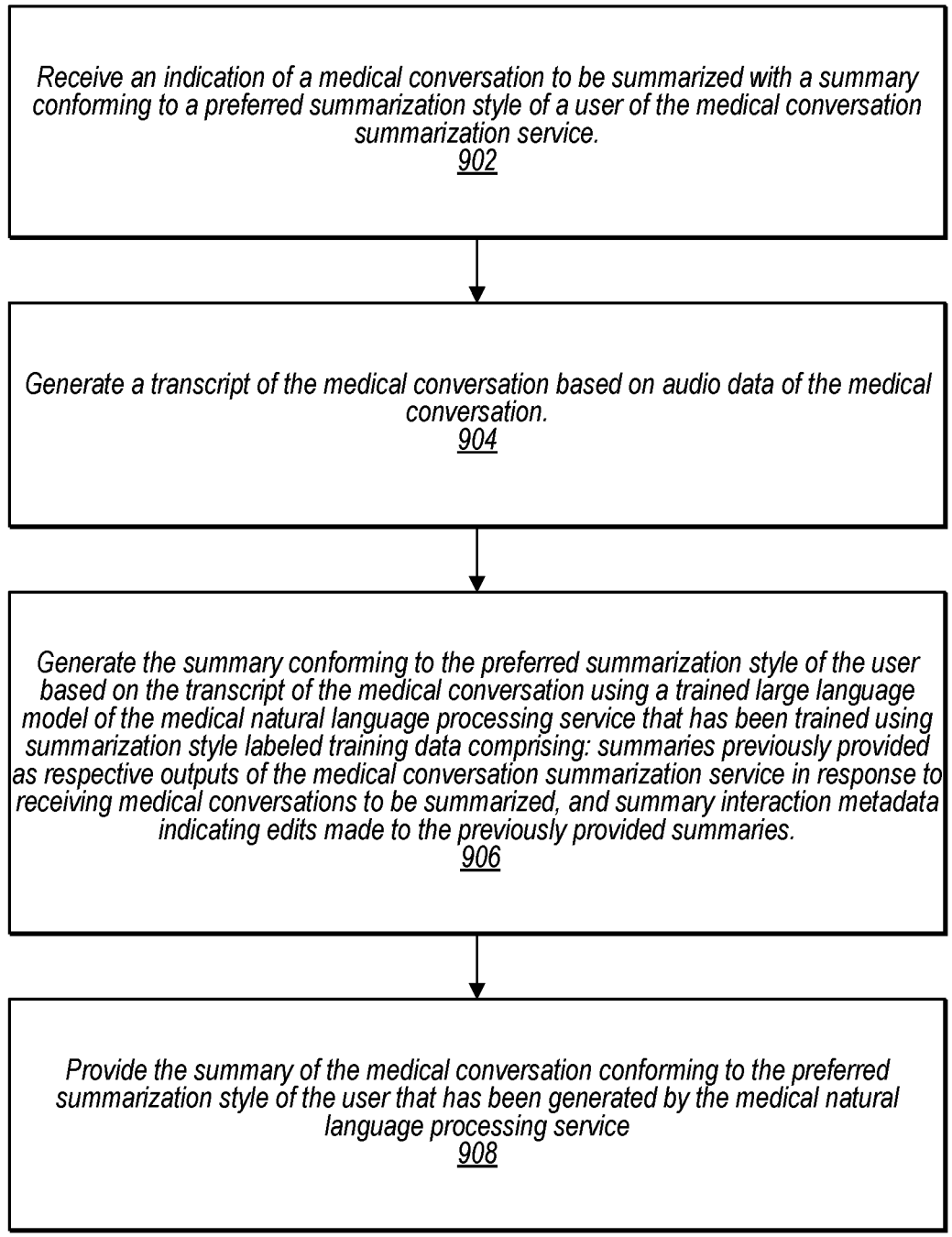
FIG. 9 is a flow diagram illustrating a process of generating a summary of a medical conversation conforming to a preferred summarization style of a user via a natural language processing service that uses a trained large language model that has been trained using outputs of the medical conversation summarization service and summary interaction metadata, according to some embodiments.

FIG. 9 is a flow diagram illustrating a process of generating a summary of a medical conversation conforming to a preferred summarization style of a user via a natural language processing service that uses a trained large language model that has been trained using outputs of the medical conversation summarization service and summary interaction metadata, according to some embodiments.

At block 902, an indication of a medical conversation to be summarized with a summary conforming to a preferred summarization style of a user of a medical conversation summarization service may be received. As discussed in FIGS. 1-5, in some embodiments, a medical audio summarization service may receive the indication of a medical conversation to be summarized, wherein the indication comprises a selection of the preferred summarization style of the user from a set of summarization styles supported by the large language model and/or may include a user provided summary sample of the preferred style of the user.

At block 904, a transcript of the medical conversation based on audio data of the medical conversation may be generated. In some embodiments, the transcript of the medical conversation may be generated via a medical transcription service based on an audio data from a medical conversation job packet associated with the indication of a medical conversation to be summarized as further discussed in FIGS. 1 and 3.

At block 906, the summary conforming to the preferred summarization style of the user based on the transcript of the medical conversation may be generated using a trained large language model of the medical natural language processing service that has been trained using summarization style labeled training data, wherein the training data comprises: summaries previously provided as respective outputs of the medical conversation summarization service in response to receiving medical conversations to be summarized, and summary interaction metadata indicating edits made to the previously provided summaries. In some embodiments, the summary interaction metadata may indicate edits to the summary such as addition/deletion of words or rearrangement of portions of the summary as discussed in FIG. 4. In some embodiments, the summary interaction metadata indicating the edits made to the previously provided summaries may comprise user edits or feedback (such as clickstream data) that conform to HIPAA standards or other standards for personally identifiable information (PII) as further discussed in FIG. 4.

At block 908, the summary of the medical conversation conforming to the preferred summarization style of the user that has been generated by the medical natural language processing service may be provided. In some embodiments, the medical conversation summarization service may provide the summary via the input interface to a user and receive user edits and feedback as further discussed in FIGS. 4 and 5A-5C.

Figure 10:
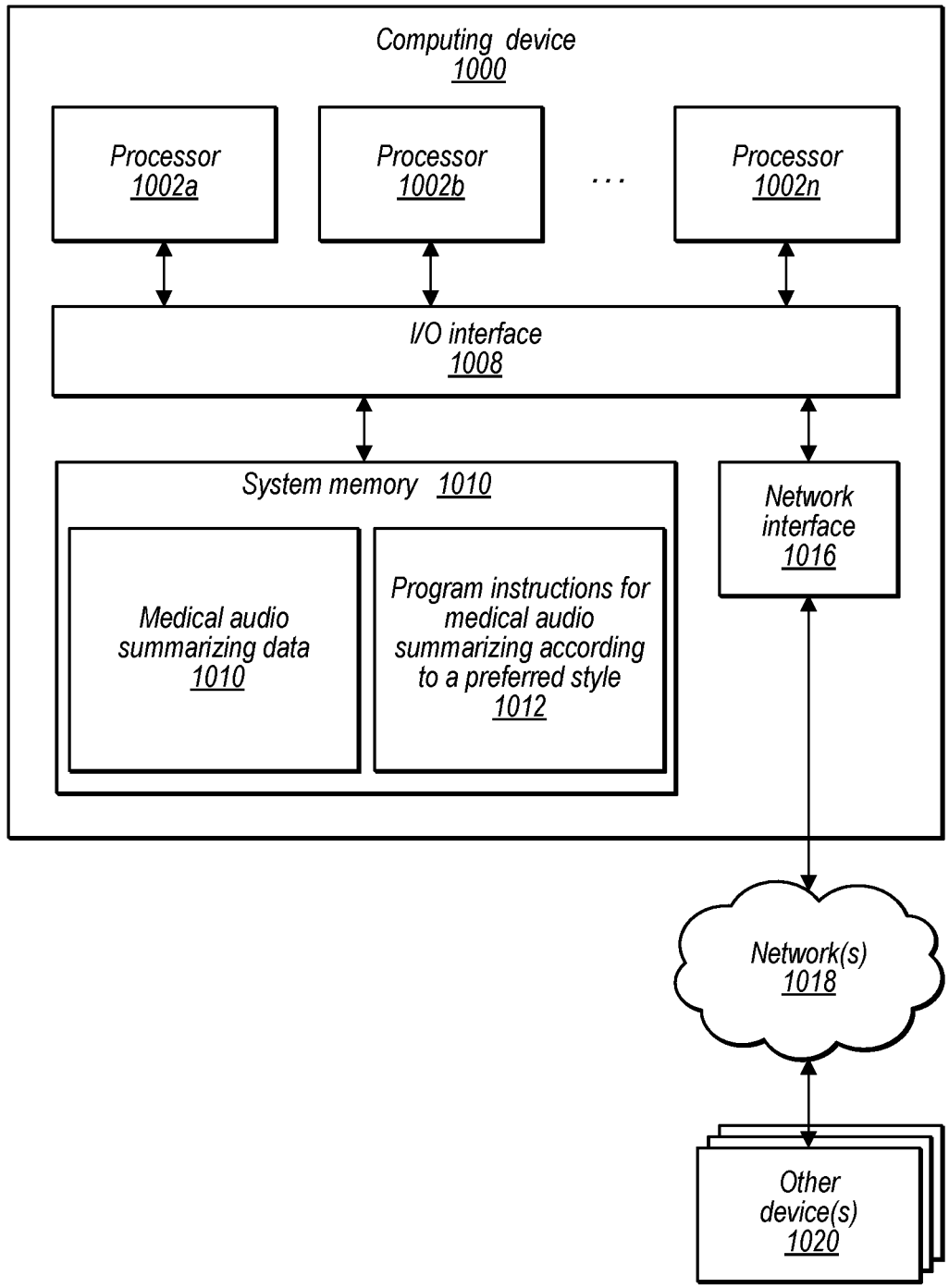
FIG. 10 is a block diagram illustrating an example computer system that implements portions of the medical audio summarizing described herein, according to some embodiments.

FIG. 10 is a block diagram illustrating an example computer system that implements portions of the medical audio summarizing described herein, according to some embodiments.

In at least some embodiments, a server that implements a portion or all of one or more of the technologies described herein, including the techniques for performing medical audio summarizing, may include a general-purpose computer system that includes or is configured to access one or more computer-accessible media. FIG. 10 illustrates such a general-purpose computing device 1000. In the illustrated embodiment, computing device 1000 includes one or more processors 1002 coupled to a system memory 1010 (which may comprise both non-volatile and volatile memory modules) via an input/output (I/O) interface 1008. Computing device 1000 further includes a network interface 1016 coupled to I/O interface 1008.

In various embodiments, computing device 1000 may be a uniprocessor system including one processor 1002, or a multiprocessor system including several processors 1002 (e.g., two, four, eight, or another suitable number). Processors 1002 may be any suitable processors capable of executing instructions. For example, in various embodiments, processors 1002 may be general-purpose or embedded processors implementing any of a variety of instruction set architectures (ISAs), such as the x86, PowerPC, SPARC, or MIPS ISAs, or any other suitable ISA. In multiprocessor systems, each of processors 1002 may commonly, but not necessarily, implement the same ISA. In some implementations, graphics processing units (GPUs) may be used instead of, or in addition to, conventional processors.

System memory 1010 may be configured to store instructions and data accessible by processor(s) 1002. In at least some embodiments, the system memory 1010 may comprise both volatile and non-volatile portions; in other embodiments, only volatile memory may be used. In various embodiments, the volatile portion of system memory 1010 may be implemented using any suitable memory technology, such as static random-access memory (SRAM), synchronous dynamic RAM or any other type of memory. For the non-volatile portion of system memory (which may comprise one or more NVDIMMs, for example), in some embodiments, flash-based memory devices, including NAND-flash devices, may be used. In at least some embodiments, the non-volatile portion of the system memory may include a power source, such as a supercapacitor or other power storage device (e.g., a battery).

In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1010 as program instructions for medical audio summarizing 1012 and medical audio summarizing data 1014. For example, program instructions for medical audio summarizing 1012 may include program instructions for implementing a medical audio summarization service, such as medical audio summarization service 100 illustrated in FIG. 1. Also, in some embodiments, program instructions for medical audio summarizing 1012 may include program instructions for implementing components of a medical audio summarizing service, such as input interface 101, audio storage 104, metadata managing system 106, user setting interface 108, medical transcription engine 110, medical natural language processing engine 122, etc.

In one embodiment, I/O interface 1008 may be configured to coordinate I/O traffic between processor 1002, system memory 1010, and any peripheral devices in the device, including network interface 1016 or other peripheral interfaces such as various types of persistent and/or volatile storage devices. In some embodiments, I/O interface 1008 may perform any necessary protocol, timing, or other data transformations to convert data signals from one component (e.g., system memory 1010) into a format suitable for use by another component (e.g., processor 1002).

In some embodiments, I/O interface 1008 may include support for devices attached through various types of peripheral buses, such as a variant of the Peripheral Component Interconnect (PCI) bus standard or the Universal Serial Bus (USB) standard, for example. In some embodiments, the function of I/O interface 1008 may be split into two or more separate components, such as a north bridge and a south bridge, for example. Also, in some embodiments, some or all of the functionality of I/O interface 1008, such as an interface to system memory 1010, may be incorporated directly into processor 1002.

Network interface 1016 may be configured to allow data to be exchanged between computing device 1000 and other devices 1020 attached to a network or networks 1018, such as other computer systems or devices as illustrated in FIG. 1 through FIG. 10, for example. Additionally, network interface 1016 may support communication via telecommunications/telephony networks such as analog voice networks or digital fiber communications networks, via storage area networks such as Fibre Channel SANs, or via any other suitable type of network and/or protocol.

In some embodiments, system memory 1010 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computing device 1000 via I/O interface 1008. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1000 as system memory 1010 or another type of memory.

In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 1016.

Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention encompasses all such modifications and changes and, accordingly, the above description to be regarded in an illustrative rather than a restrictive sense.

What is claimed is:

1. A system, comprising:
one or more computing devices, configured to:
receive, via a medical conversation summarization service, an indication of a medical conversation to be summarized with a summary conforming to a preferred summarization style of a user of the medical conversation summarization service;
generate, via a medical transcription service, a transcript of the medical conversation based on audio data of the medical conversation;
generate, via a medical natural language processing service, the summary conforming to the preferred summarization style of the user based on the generated transcript of the medical conversation,
wherein to generate the summary conforming to the preferred summarization style of the user, the medical natural language processing service uses a trained large language model that has been trained using summarization style labeled training data comprising:
summaries conforming to the preferred summarization style of the user previously provided as respective outputs of the medical conversation summarization service in response to receiving medical conversations to be summarized, and
summary interaction metadata indicating edits made to the previously provided summaries conforming to the preferred summarization style of the user; and
provide, via the medical conversation summarization service, the summary of the medical conversation conforming to the preferred summarization style of the user that has been generated by the medical natural language processing service.

2. The system of claim 1, wherein the indication of the medical conversation to be summarized with the summary conforming to the preferred summarization style of the user of the medical conversation summarization service comprises a selection of the preferred summarization style of the user from a set of available summarization styles or a user provided summary sample,
wherein the one or more computing devices are further configured to generate the summary conforming to the preferred summarization style of the user based on the indication of the preferred summarization style.

3. The system of claim 2, wherein the set of available summarization styles are styles that the large language model has been trained to generate, and wherein the summaries previously provided as respective outputs of the medical conversation summarization service comprise previously provided summaries that were generated or labeled according to respective ones of the set of available summarization styles.

4. The system of claim 1, wherein the one or more computing devices are configured to:
classify, using the large language model of the medical conversation summarization service, a style of a user provided summary sample as one of a set of available summarization styles, wherein the classified one of the set of the available summarization styles is used as the preferred summarization style of the user.

5. The system of claim 1, wherein the one or more computing devices are configured to:
receive the summarization style labeled training data comprising:
the summaries previously provided as respective outputs of the medical conversation summarization service in response to receiving medical conversations to be summarized, and the summary interaction metadata indicating edits made to the previously provided summaries;
train the large language model using the summarization style labeled training data.

6. A method, comprising:
receiving, via a medical conversation summarization service, an indication of a medical conversation to be summarized with a summary conforming to a preferred summarization style of a user of the medical conversation summarization service;
generating, via a medical natural language processing service, the summary conforming to the preferred summarization style of the user based on a transcript of the medical conversation, wherein the transcript is generated based on audio data of the medical conversation using a medical transcription service,
wherein generating the summary conforming to the preferred summarization style of the user is performed using a trained large language model of the medical natural language processing service that has been trained using summarization style labeled training data comprising:
summaries conforming to the preferred summarization style of the user previously provided as respective outputs of the medical conversation summarization service in response to receiving medical conversations to be summarized, and
summary interaction metadata indicating edits made to the previously provided summaries conforming to the preferred summarization style of the user; and
providing, via the medical conversation summarization service, the summary of the medical conversation conforming to the preferred summarization style of the user that has been generated by the medical natural language processing service.

7. The method of claim 6, further comprising:
receiving additional summarization style labeled training data comprising:
the summary of the medical conversation conforming to the preferred summarization style of the user that has been generated by the medical natural language processing service; and
additional summary interaction metadata indicating edits made to the summary of the medical conversation conforming to the preferred summarization style of the user; and
training the large language model using the additional summarization style labeled training data.

8. The method of claim 7, wherein the edits made to the summary of the medical conversation conforming to the preferred summarization style of the user comprise one or more user edits that lengthen or shorten the summary, and wherein training the large language model using the additional summarization style labeled training data comprises training the large language model to adjust the preferred summarization style of the user to include a lengthened or shortened summary style.

9. The method of claim 7, wherein the edits made to the summary of the medical conversation conforming to the preferred summarization style of the user comprise one or more rearrangements of information by the user, and wherein training the large language model using the additional summarization style labeled training data comprises training the large language model to alter arrangement of information for the preferred summarization style of the user.

10. The method of claim 7, wherein the edits made to the summary of the medical conversation conforming to the preferred summarization style of the user comprise one or more user edits that lengthen or shorten the summary, and wherein the method further comprises:
updating the preferred summarization style of the user to a different one of a plurality of summarization styles based on the user edits that lengthen or shorten the summary.

11. The method of claim 7, further comprising:
determining, based on the additional summary interaction metadata, another summarization style labeled training data that is needed to be used in training the large language model;
requesting the another summarization style labeled training data; and
training the large language model using the another summarization style labeled training data.

12. The method of claim 6, wherein the indication of the medical conversation to be summarized with the summary conforming to the preferred summarization style of the user of the medical conversation summarization service comprises a selection of the preferred summarization style of the user from a set of available summarization styles or a user provided summary sample.

13. The method of claim 12, wherein the set of available summarization styles are styles that the large language model has been trained to generate, and wherein the summaries previously provided as respective outputs of the medical conversation summarization service comprise previously provided summaries that were generated or labeled according to respective ones of the set of available summarization styles.

14. The method of claim 6, further comprising:
determining, using the large language model of the medical conversation summarization service, whether a style of a user provided summary sample matches one of a set of available summarization styles, wherein the determined one of the set of the available summarization styles is used as the preferred summarization style of the user.

15. The method of claim 14, further comprising:
in response to determining that the style of the user provided summary sample does not match any one of the set of available summarization styles, receiving additional summarization style labeled training data comprising summaries generated or labeled according to a new style that matches the style of the user provided summary sample; and
training the large language model using the additional summarization style labeled training data.

16. The method of claim 15, further comprising:
adding the new style that matches the style of the user provided summary sample to the set of available summarization styles, wherein the new style is available to be selected as the preferred summarization style of the user.

17. The method of claim 6, wherein the indication of the medical conversation to be summarized with the summary conforming to the preferred summarization style of the user comprises one or more indications for respective sub-sections of the summary to conform to respective preferred sub-section summarization styles.

18. The method of claim 6, wherein the medical conversation to be summarized with the summary conforming to the preferred summarization style of the user comprises a medical conversation in a context of a specific medical specialty, and wherein the summaries previously provided as respective outputs of the medical conversation summarization service that were used to train the large language model comprise previously provided summaries of medical conversations in the context of the specific medical specialty.

19. A non-transitory, computer-readable medium storing program instructions that, when executed using one or more processors, cause the one or more processors to:
receive, via a medical conversation summarization service, an indication of a medical conversation to be summarized with a summary conforming to a preferred summarization style of a user of the medical conversation summarization service;
generate, via a medical natural language processing service, the summary conforming to the preferred summarization style of the user based on a transcript of the medical conversation, wherein the transcript is generated based on audio data of the medical conversation using a medical transcription service,
wherein to generate the summary conforming to the preferred summarization style of the user, the medical natural language processing service uses a trained large language model that has been trained using summarization style labeled training data comprising:
  summaries conforming to the preferred summarization style of the user previously provided as respective outputs of the medical conversation summarization service in response to receiving medical conversations to be summarized, and
  summary interaction metadata indicating edits made to the previously provided summaries conforming to the preferred summarization style of the user; and
provide, via the medical conversation summarization service, the summary of the medical conversation conforming to the preferred summarization style of the user that has been generated by the medical natural language processing service.

20. The non-transitory, computer-readable medium storing program instructions of claim 19, wherein the indication of the medical conversation to be summarized with the summary conforming to the preferred summarization style of the user of the medical conversation summarization service comprises a selection of the preferred summarization style of the user from a set of available summarization styles or a user provided summary sample.

* * * * *